(12) United States Patent
Kadah et al.

(10) Patent No.: US 9,465,407 B2
(45) Date of Patent: Oct. 11, 2016

(54) CONTROLLER WITH DYNAMICALLY INDICATED INPUT DEVICES

(71) Applicant: ICM Controls Corporation, North Syracuse, NY (US)

(72) Inventors: Andrew S. Kadah, Manlius, NY (US); Weidong Pan, Morganville, NJ (US); Hollis Jordan Gmyr, Liverpool, NY (US); James H. Ritchie, Pennellville, NY (US); Eric Christopher Wood, East Syracuse, NY (US); Benjamin A. Freer, Syracuse, NY (US); Michael Peter Muench, Canastola, NY (US); Kevin Jobsky, Camillus, NY (US)

(73) Assignee: ICM CONTROLS CORPORATION, North Syracuuse, NY (US)

( * ) Notice: Subject to any disclaimer, the term of this patent is extended or adjusted under 35 U.S.C. 154(b) by 0 days.

(21) Appl. No.: 14/561,381

(22) Filed: Dec. 5, 2014

(65) Prior Publication Data
US 2015/0160691 A1    Jun. 11, 2015

Related U.S. Application Data

(60) Provisional application No. 61/913,224, filed on Dec. 6, 2013.

(51) Int. Cl.
| | |
|---|---|
| *G06F 3/045* | (2006.01) |
| *G06F 1/16* | (2006.01) |
| *G05B 15/02* | (2006.01) |
| *G06F 3/041* | (2006.01) |

(Continued)

(52) U.S. Cl.
CPC ................ *G06F 1/16* (2013.01); *G05B 15/02* (2013.01); *G06F 3/044* (2013.01); *G06F 3/0416* (2013.01); *G06F 3/0482* (2013.01); *G06F 3/04895* (2013.01)

(58) Field of Classification Search
CPC .... G06F 3/0416; G06F 3/044; G06F 3/0482; G06F 3/0489; G06F 3/04895; G06F 3/04897; G06F 1/16; G05B 15/02
See application file for complete search history.

(56) References Cited

U.S. PATENT DOCUMENTS

| | | | |
|---|---|---|---|
| 6,842,170 B1 * | 1/2005 | Akins ............... | G02F 1/133603 178/18.01 |
| 8,167,216 B2 * | 5/2012 | Schultz .................. | F24F 11/006 236/1 B |

(Continued)

OTHER PUBLICATIONS

International Search Report and Written Opinion for Application No. PCT/US2014/068877 mailed May 8, 2015.

*Primary Examiner* — Joe H Cheng
(74) *Attorney, Agent, or Firm* — Merchant & Gould P.C.

(57) ABSTRACT

A user interface of a controller has multiple touch-sensitive input transducers, e.g., capacitive pads. The pads are dynamically indicated: When any given touch sensitive input device is needed for input at a given step of the programming operation, an associated light source illuminates that input device so it is visible to the user. Those touch-panel input devices not needed for that are left unilluminated, and the microprocessor ignores any input from those input devices. At each step of the operation or programming of the controller, only those input transducers for the inputs that are permitted or relevant to that state are indicated. Correspondingly, only the inputs that are generated by actuating the input transducers for the valid (i.e., permitted or relevant) inputs results in a change in the state of the program in the microprocessor.

15 Claims, 24 Drawing Sheets

(51) Int. Cl.
 *G06F 3/044* (2006.01)
 *G06F 3/0489* (2013.01)
 *G06F 3/0482* (2013.01)

(56) References Cited

U.S. PATENT DOCUMENTS 9,206,993 B2 * 12/2015 Barton ................. F24F 11/0009
2002/0003595 A1 * 1/2002 Yazawa ............. G02F 1/133603
  349/65
2005/0240312 A1 * 10/2005 Terry ................... F24F 11/0086
  700/276
2007/0019942 A1 * 1/2007 Kurosawa ............. G03B 13/02
  396/287
2008/0204417 A1 8/2008 Pierce et al.
2010/0085207 A1 4/2010 Leung
2011/0015802 A1 * 1/2011 Imes ................. G05D 23/1923
  700/300

* cited by examiner

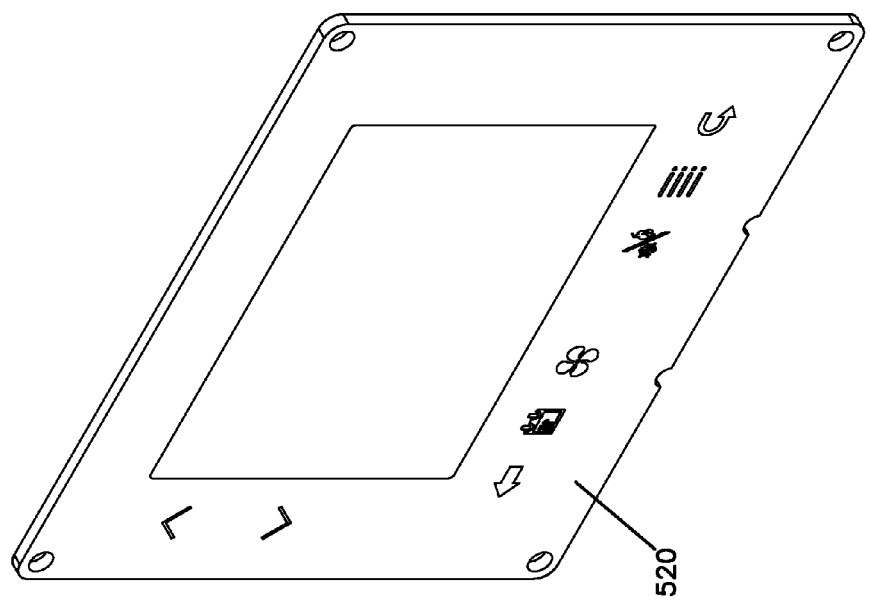
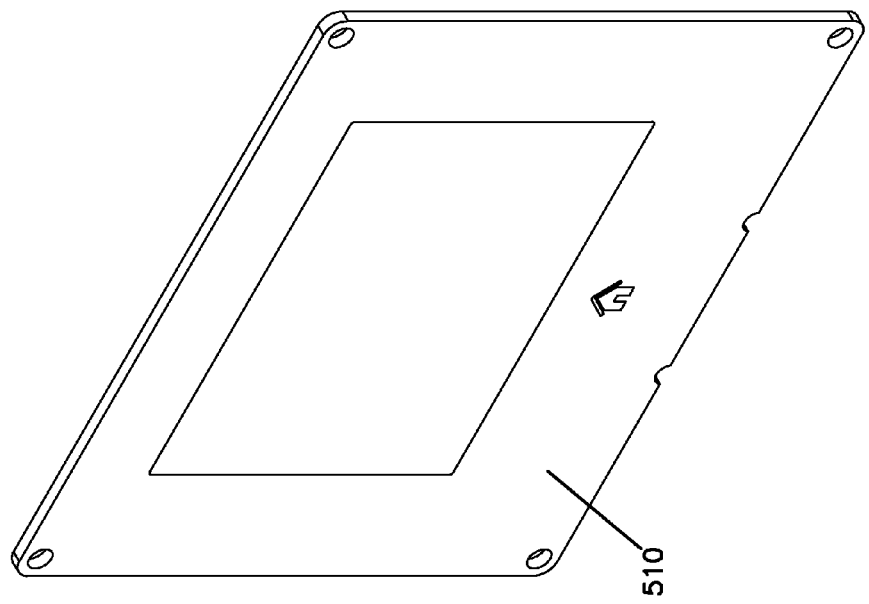

CONTROLLER WITH DYNAMICALLY INDICATED INPUT DEVICES

CROSS-REFERENCE TO RELATED APPLICATIONS

This application claims the benefit of U.S. Provisional Application Ser. No. 61/913,224, filed Dec. 6, 2013, the content of which provisional application is incorporated herein by reference.

BACKGROUND

The present disclosure relates generally to controllers, including appliance controllers, and more particularly to controllers having user interfaces with input switches or sensors, e.g., pushbuttons or touch pad keys. The disclosure is more specifically directed to a controller arrangement which is intuitive to use and which eliminates sources of confusion and mistake in operation. The disclosure is also directed to an arrangement for the display of the controller to be simple with the operating keys that are not required for a given operation to be blanked out and disabled.

One example of an appliance controller is a programmable thermostat which is intended to control operation of an HVAC system, which may include a furnace, air conditioner, heat pump, fan, etc. These appliance controllers are capable of being programmed, i.e., having a settable schedule for changing the thermostat set points for heating and cooling for various times on the different days of the week, typically as a means of avoiding needless heating or cooling of the living quarters when the occupants are absent. Thermostats and other appliance controllers may have numerous functional controls to program or regulate and increasing number of features of the HVAC system, such as relative humidity, fan speed, compressor speed, etc, with operational and programming choices becoming more complex as a result. The resulting complexity of the control interface often has a negative impact on the user experience.

More specifically, although many homeowners have programmable thermostats installed in their homes, many homeowners do not bother to program them properly. This happens largely because the process for programming the thermostat with the set points for different times and days is too complex to be easily followed. In most cases, the operations guide that may have been provided by the manufacturer is lost or misplaced, or is itself too difficult for the homeowner to follow. The need for a design that would make the control interface more intuitive, and guide the homeowner through the programming process is one problem that has needed to be addressed.

There are many other examples of appliances whose control interface could or should be made simpler, and less baffling to the user, and one such example is the multifunction microwave oven, although that is but one of many appliances that could benefit from the approaches taken here.

Thus an unmet need exists to design appliance controllers with more convenient, non-confusing, intuitive user interfaces.

SUMMARY

Modern thermostats and other appliance controllers often have dynamically indicated input devices such as transducers and switches which can interface with control electronics, e.g., a microprocessor or the like to carry out timing and regulation of one or more functions of the furnace or other appliance. In order to guide the user, i.e., homeowner or occupant of the heated or conditioned space through the step by step set up of the controller, the interface should highlight which controls are operative with the next step or phase in the programming operation, and hide or blank out the push buttons or switches that are not involved in that step. The controller interface typically has multiple input devices, i.e., numerous keys or buttons. The operation and/or programming of the control would be improved if only those input devices that are relevant to each particular step of the programming function are turned on and made visible, with the other input devices being off or at least ignored by the microprocessor, and either hidden or simply not illuminated.

In one example, a programmable thermostat has multiple touch-sensitive input transducers, e.g., capacitive pads. These pads are at the reverse side of a blank or dead-face touch-panel. Icons are formed as shaped voids in the capacitive pads, and when any given touch sensitive input device is needed for input at a given step of the programming operation, an associated LED illuminates that icon so it is visible through the front of the touch-panel. Those touch-panel input devices not needed for that are left blank, i.e., their associated LED is kept OFF, and the microprocessor ignores any input from those input devices. At each step of the operation or programming of the thermostat, only those input transducers for the inputs that are permitted or relevant to that state are lit; the remaining input transducers are unlit. Correspondingly, only the inputs that are generated by actuating the input transducers for the valid (i.e., permitted or relevant) inputs results in a change in the state of the program in the microprocessor. For example, when the microprocessor receives an input from an active input device, that serves to advance the programming (i.e., to choose an set-up option), and as a result only certain of the input devices that happen to be the appropriate for the next step in the set up or programming are regarded by the microprocessor as valid inputs devices. Only inputs from those devices are accepted at the microprocessor. Any inputs received from any other input devices are considered invalid inputs, and, if generated, they will be ignored.

One aspect of this disclosure includes presenting as simple and attractive a look as possible, and to make the setting and programming of the thermostat self-guiding, and hopefully therefore increase the likelihood that the homeowner will actually program the stat despite not having read the customer operations manual. There is also a need to keep the internal connections and functionalities simple and economical to manufacture without sacrificing reliability.

According to several aspects of this disclosure, a control, in the form of a wall thermostat, is provided with a "Dead Face"—with no icons showing until the thermostat "wakes up" with the possible exception of a "home" icon used to wake up or turn on the interface. In some cases, the home icon could be textured on the front, rather than printed so as to be less visible, but still easy for the consumer to find. Other information on the user interface of the thermostat, e.g., a logo, can also be normally blank but visible and backlit when the control is woken up.

In an embodiment of the control interface, the operating information, i.e., time and temperature, are reported on an LCD display or equivalent (such as an AMOLED display) positioned behind the front "dead face" front plate of the control interface, and all functions are carried out using icons and touch sensors situated on the margin of the front plate and outside the perimeter of the LCD (or other) display.

Favorably, the LEDs that illuminate the individual icons are only active and lit when the respective touch sensors are active. This ensures that only the icons involved with the particular procedure involved in the programming the control are identified, and only the corresponding touch sensor elements are activated or considered valid. This allows the program to guide the user through the steps of programming the thermostat, because only the touch sensors/icons that are needed for that process or step are active and visible, minimizing the confusion of having too many choices.

LEDs associated with the icons/touch sensors can optionally be located in various places, depending on circuit design. In one embodiment, the LEDs are positioned on the printed circuit board or PCB that is spaced a short distance behind the touch-panel. The LEDs are located on the margin of the PCB. A spacer positioned between the PCB and the touch-panel is formed with white or silvered domed reflectors that serve as light conduits from the LEDs to the icons. The spacer can have openings and reflectors for more LEDs than are shown in the described embodiment, favorably extending across the entire margin. Only some of these would be located at positions of the icons and LEDs, but this construction allows the same spacer to be employed for other versions with more touch sensors and more LEDs. In an alternative version, LEDs and reflector domes can be mounted directly onto the touch-panel at the locations of the touch sensor/icons on the front panel. These LEDs would each be electrically connected to the PCB to be turned on and off. There would then be conductive pads on the front panel glass to connect them to the PCB. An elastomeric conductor strip can be used to connect the pads on the front panel to corresponding connector pads on the PCB. Either approach allows for upgrades in the thermostat, adding additional icons and touch sensors by simply by printing them on and installing the LEDs, without need to re-design the entire interface.

A solder-less connector, e.g., a "zebra" elastomeric conductor strip is compressively fitted between the connector pads on the front panel and the corresponding connector pads on the PCB. The face plate is then secured with enough compression to ensure a good connection. This construction achieves a cost advantage and also enhances the effectiveness and reliability of the control interface. Other mechanical connections, e.g., spring pins, may be an effective alternative in some designs.

In some designs the icons, touch pads, conductive paths or traces, and connector pads can be formed on the back surface of the transparent front plate, which may favorably be a clear acrylic. The conductive elements can be printed directly on the back of the acrylic front plate. Alternative, a thin film of a suitable substrate or membrane (e.g., PET) can carry these icons, conductive paths and connector pads. This may be carried out by ink-jet printing a suitable conductive ink onto the plastic film substrate, and applying the printed film substrate to the back of the front plate.

The control interface can be easily upgraded from one model to the next, adding more functions by printing more icons/touch pads (and with more LEDs), simply by changing the pattern for printing on the back of the acrylic plate or film.

The construction of the a touch-panel control interface according this disclosure makes it possible for the front plate to be curved instead of flat to follow the design contours of the thermostat housing. It is also possible to employs a curved display in place of the flat LCD display screen, which could be incorporated into the control interface behind the contoured front plate.

A clip-on label tab can snap into place at top center of the front frame or bezel of the device, e.g., for customizing the thermostat for a given HVAC contractor.

Thermostats or other appliance control interfaces that incorporate certain features disclosed in this disclosure can employ a fully blank front plate, with no printed icons for "home" or anything else, until the thermostat is activated or woken up. An alternative means for waking up the thermostat could be used, e.g., proximity detector or by touch for some period of seconds. As an option, the LCD screen (or other equivalent screen) can be blanked out, i.e., room temp and set-points hidden and not visible, until the thermostat has been woken up. In some cases, the time and temperature may be left visible and other indices blanked out until the thermostat display is activated.

According to certain aspects of this disclosure, a thermostat or other control interface device can be constructed with the locations of keys or icons raised or embossed on the front of the plastic face plate. A synthetic speech feature so that the thermostat can be adapted for vision-impaired persons, who may need to adjust the thermostat settings despite being unable to see the legends and numbers on the face of the thermostat. The synthetic speech feature can announce program modes and can also announce the selected heat or air conditioning setpoints.

Another example of an appliance whose control interface could well benefit from certain features according to this disclosure is a microwave oven. Microwave ovens have a very complex and confusing interface, and each model is different. Persons trying to operate an unfamiliar microwave oven often have to study it for several minutes before they can even guess where to start the oven-setting procedure. This happens frequently where the microwave oven is stationed in a public cafeteria. The typical microwave oven control interface can have numerous, even dozens of control buttons or touch areas all crowded onto the front face of the control. By employing certain features according to this disclosure, the interface can be made much simpler, e.g., with only "sensor cooking" and a "express cooking" i.e., timed cooking, areas being visible. Additional functions, such as kitchen timer and clock set, which are normally not needed, would be hidden and only activated if a "MORE" button is touched. To use the oven, the user touches either the "express cook" area or the "sensor cook" area, which activates and lights up the express cook group of buttons or the sensor cook group of buttons. All the remaining buttons would be hidden. The user can then set the cook time desired (in the case of express cook) or choose a power level. Once the microwave oven cooking is started, the screen becomes more simplified, exhibiting only add-time, pause, and stop buttons.

Certain features according to this disclosure make any control interface dramatically more user friendly. An optimized design can be achieved for a multitude of control interfaces, reducing the complexity of the array of push buttons or control buttons, hiding those not necessary for a given operation and revealing them only when they are needed.

BRIEF DESCRIPTION OF THE DRAWINGS

FIG. 5 schematically shows (a) the front side and (b) the back side (without the electrode layer) of the capacitive touch panel shown in FIG. 3 according to one aspect of the disclosure.

(FIG. 10-17 show only the state of illumination of the input keys; the content of the display area is not shown.)

FIG. 11 schematically shows the state of illumination of the input sensors in thermostat shown in FIG. 3 after the Mode key is touched in the state shown in FIG. 10 according to one aspect of the disclosure.

FIG. 12 schematically shows the state of illumination of the input sensors in thermostat shown in FIG. 3 after the Fan key is touched in the state shown in FIG. 10 according to one aspect of the disclosure.

FIG. 13 schematically shows the state of illumination of the input sensors in thermostat shown in FIG. 3 after the Schedule key is touched in the state shown in FIG. 10 according to one aspect of the disclosure.

FIG. 14 schematically shows the state of illumination of the input sensors in thermostat shown in FIG. 3 after the Schedule key is touched in the state shown in FIG. 13 to set the schedule to "Vacation" according to one aspect of the disclosure.

FIG. 15 schematically shows the state of illumination of the input sensors in thermostat shown in FIG. 3 after the Right key is touched in the state shown in FIG. 14 according to one aspect of the disclosure.

FIG. 16 schematically shows the state of illumination of the input sensors in thermostat shown in FIG. 3 after the Menu key is touched in the state shown in FIG. 10 according to one aspect of the disclosure.

FIG. 17 schematically shows the state of illumination of the input sensors in thermostat shown in FIG. 3 after the Right key is touched in the state shown in FIG. 16 when the menu is set to "EDIT SCHED" (Edit Schedule) according to one aspect of the disclosure.

DETAILED DESCRIPTION

Specific embodiments of the invention are given below as non-limiting examples. A controller, such as an appliance controller, employs dynamically indicated input devices or input elements, such as transducers and switches on in the disclosed example, capacitive touch pads. At each stage of the operation or programming of the controller, out of the multiple input devices or elements, only those input devices or elements for the input commands that are permitted or relevant to that stage are indicated as operable; the remaining input devices are not indicated as operable, e.g., left dark.

In one example, a programmable thermostat employs multiple touch-sensitive input transducers. At each stage of the operation or programming of the thermostat, only those input transducers for the inputs that are permitted or relevant to that state are lit; the remaining input transducers are off or unlit. Correspondingly, the control interface is sensitive only to the input commands that are generated by actuating the input transducers for the valid (i.e., permitted or relevant) inputs results that are needed for change in that stage of the programming. For example, such input commands may be used by a microprocessor in the thermostat to advance the programming to the appropriate next step depending on which one of the valid input commands is received. The remaining input commands (invalid inputs), if generated, will be ignored.

Numerous suitable indications for valid or invalid input elements can be used. For example, the input transducers or elements can be transparent or translucent and can be illuminated from behind to indicate which are valid inputs; actuation of unilluminated transducers will be ignored have no effect on the programming or operation of the thermostat. Alternatively, transducers for both valid and invalid inputs can be illuminated, but with different color light sources (green for valid and red for invalid, for example). As another example, indicator light sources such as LEDs can be located adjacent to the respective input transducers. The indicator light sources can be turned on for valid inputs and left off for the invalid inputs. The indicator lights can also be multi-colored, and different colors can be used to indicate whether the respective transducers are for valid or invalid inputs.

Figure 1:
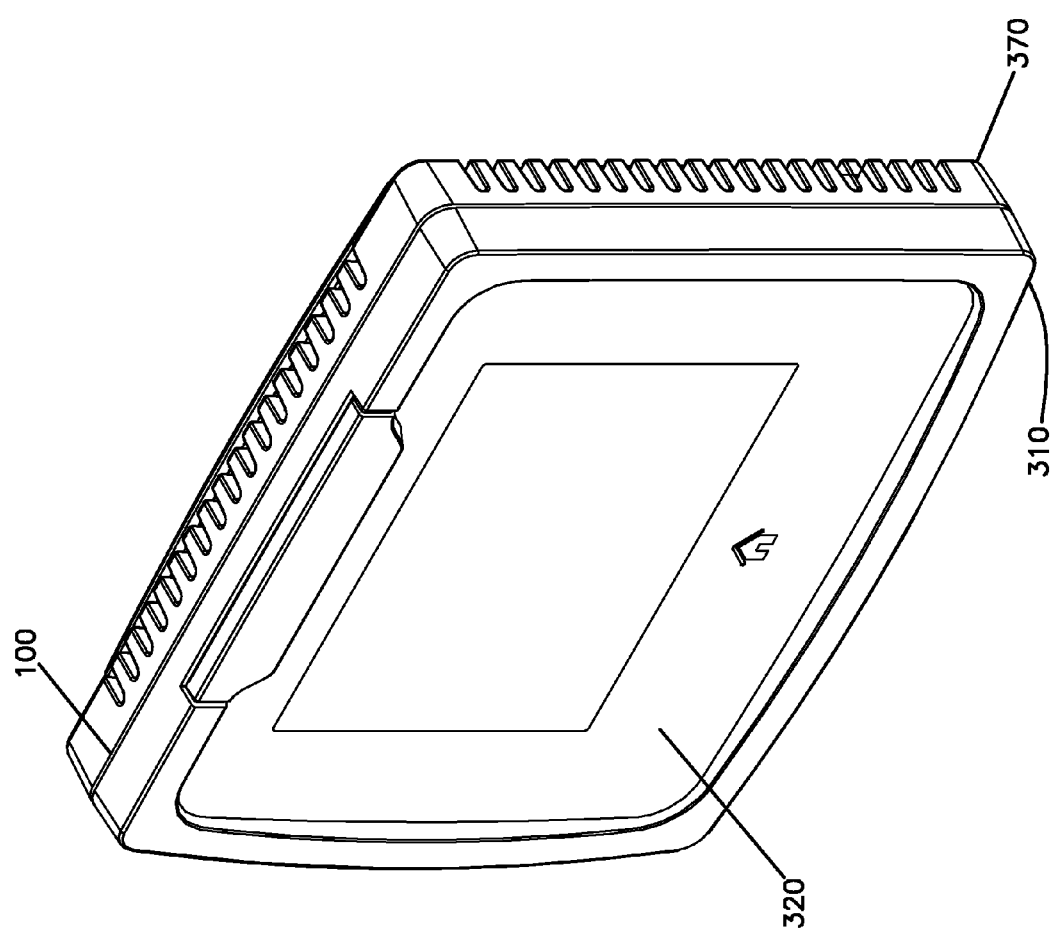
FIG. 1 schematically shows a perspective front view of an appliance interface control, in this embodiment, a wall thermostat, according to one aspect of the disclosure.
Figure 2:
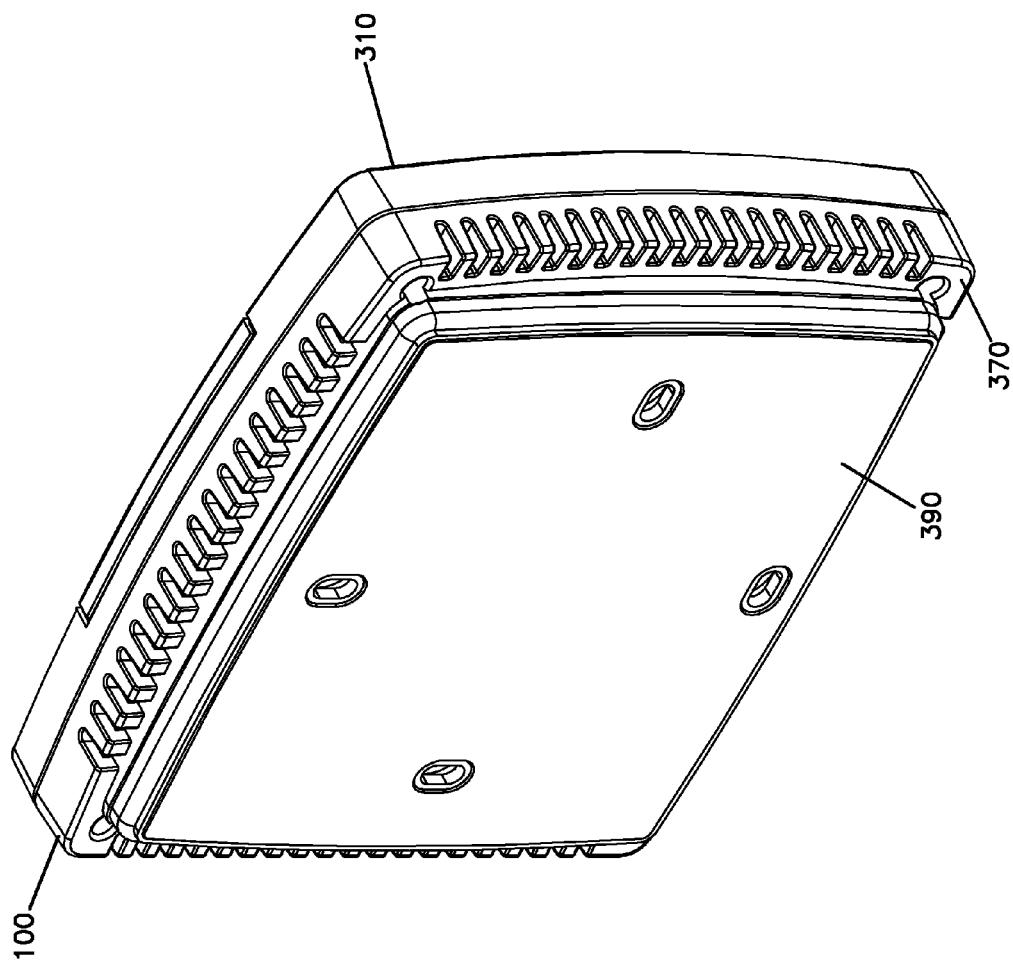
FIG. 2 schematically shows a perspective back view of the thermostat shown in FIG. 1 according to one aspect of the disclosure.

FIGS. 1-8 illustrate one example of a controller interface, namely a thermostat (100). FIG. 1 is a perspective front view of the thermostat (100) according to one aspect of this disclosure, and FIG. 2 is a perspective back view thereof.

Figure 3:
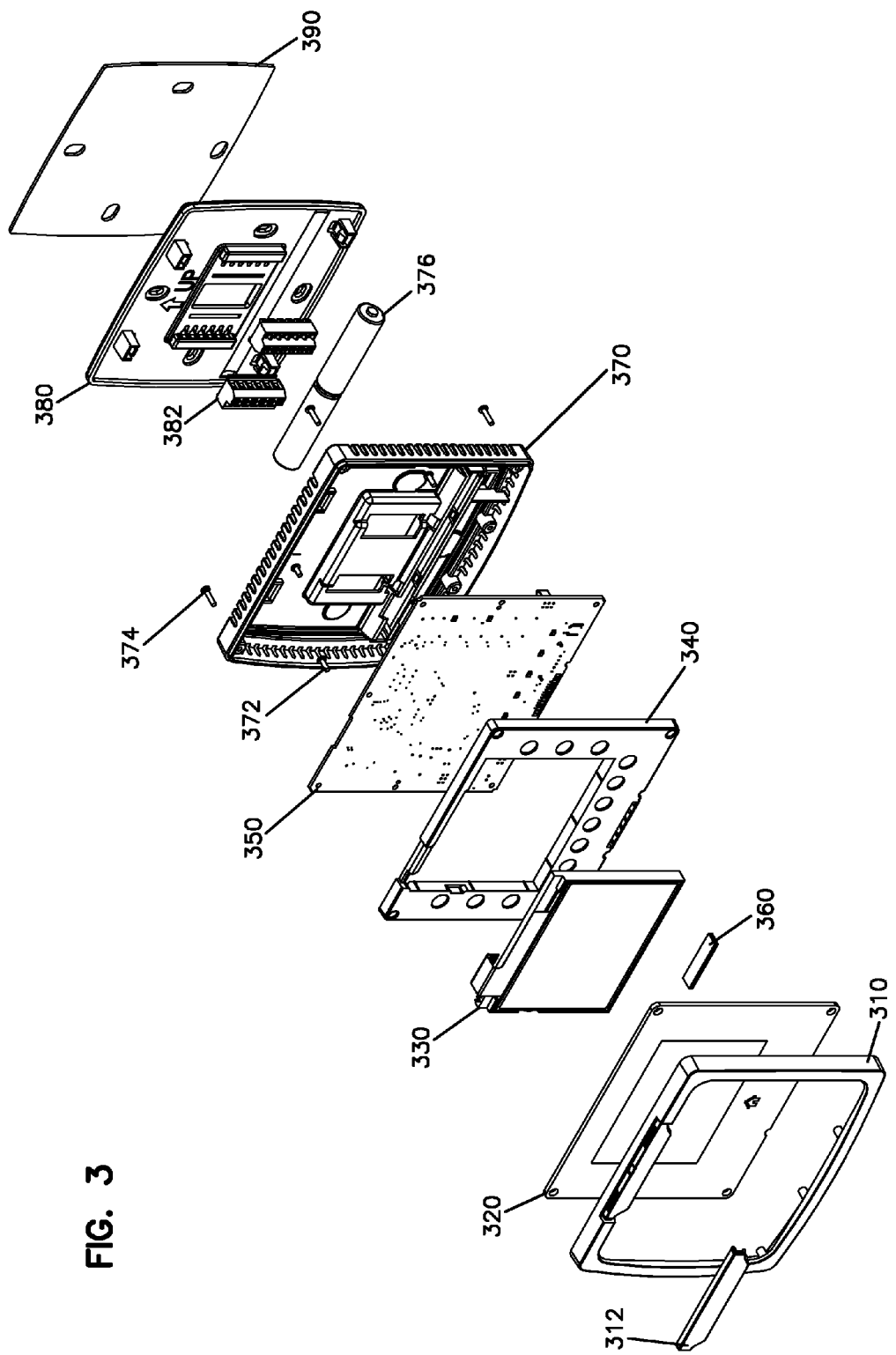
FIG. 3 schematically shows an exploded or assembly view of the main components of the thermostat of FIGS. 1 and 2.

FIG. 3 is an exploded assembly view of the main components of the thermostat (100) shown in FIGS. 1 and 2, both the case or housing and the contents. A front bezel (310) or frame supports a custom label base (312). Behind the front bezel (310) is a capacitive touch panel (320) or front plate, followed by a liquid crystal display (LCD) (330) (or another type of display such as electrophoretic ink or LED display), which in this example is a backlit display module. The LCD (330) is situated within a cutout of a mounting frame or spacer (340), and is mounted at that location on a printed circuit board or PCB (350). The remainder of the PCB (350) is disposed behind the mounting frame (340) and the PCB is electrically connected to electrodes (described later) on the back of the capacitive touch panel via a conductor, and in this embodiment, an elastomeric conductor (360) is employed. The PCB (350) is also electrically connected to the LCD (330). The PCB incorporates other electronic circuitry of the thermostat, including in this example a microprocessor (not specifically shown). The latter includes suitable programming and software configured to execute program steps to control the various aspects of the operation of the thermostat. A back cover (370) serves as a base of the thermostat (100). Various hardware, including PCB mounting hardware (372) and enclosure hardware (374), used to secure and/or align various parts of the thermostat with respect to each other. In this example, the thermostat (100) is powered by batteries (376), e.g., alkaline power cells, which are accommodated in a battery holder formed the back cover (370) and electrically connected to the PCB (350).

A wall plate (380) can be fastened to a wall or other support structure, with an optional thermal intrusion barrier (390) disposed between them. The thermostat (100) can be secured by pushing it onto the wall plate where it is secured by snap-action connectors or other type of fastener. The wall plate further supports terminal blocks (382), which provide electrical connections between the thermostat and the HVAC appliances that the thermostat controls by connecting wires to connector pins (not shown in the drawings) on the back cover (370) of the thermostat (100).

Figure 4:
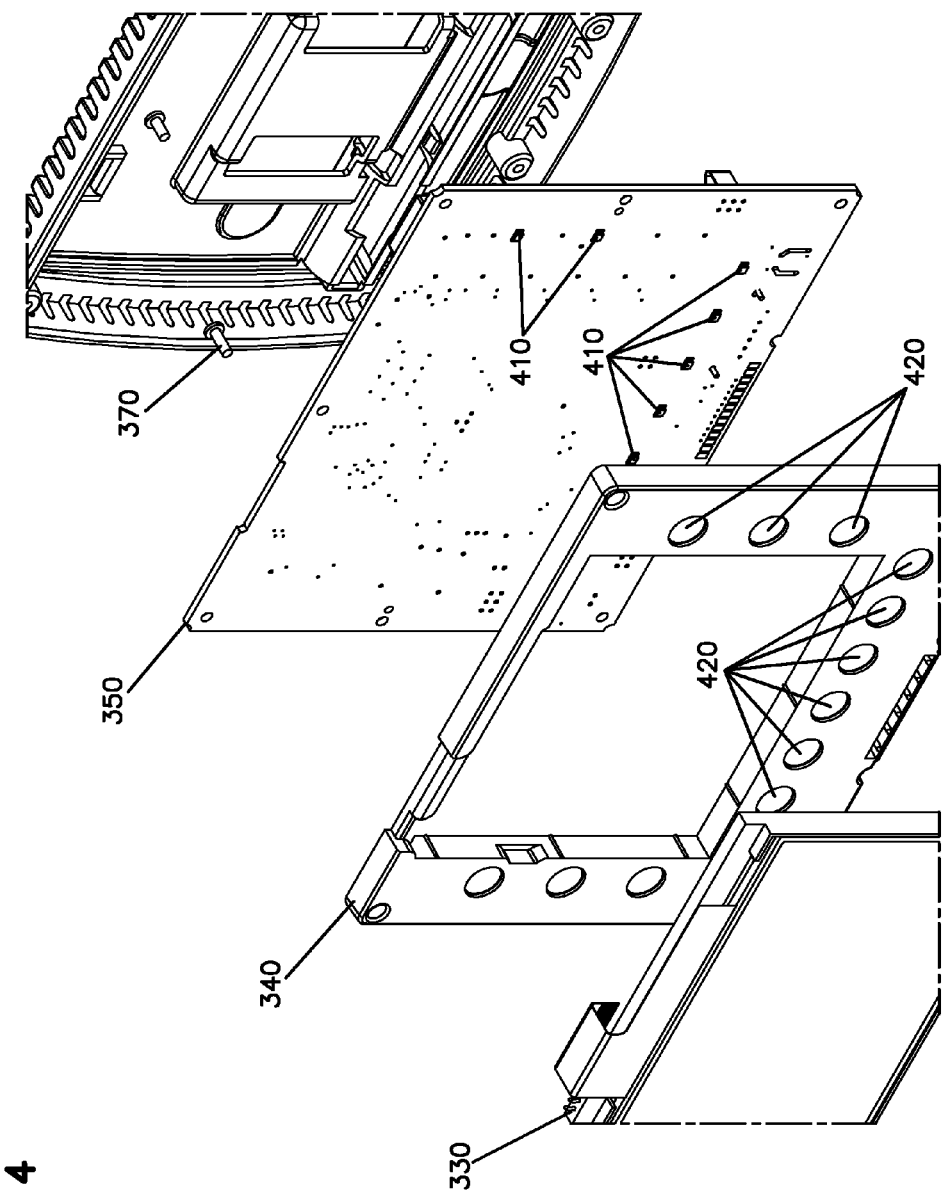
FIG. 4 schematically shows a portion of FIG. 3 and shows details of certain aspects of the circuit board according to one aspect of the disclosure.

As shown in FIG. 4, which highlights a portion of FIG. 3, light sources, such as LEDs (410) are mounted at predetermined places on the PCB (350) and aligned or registered with respective input transducer elements, for illuminating those input transducer elements, as discussed below. The light sources can be of a variety of types. Examples include white LEDs, pairs of LEDs of different colors, multi-color LEDs, neon bulbs and incandescent lamps. Correspondingly, the PCB mounting frame (340) has formed along its periphery a plurality of apertured domed reflectors (420) to guide the light from the light sources (410) to the capacitive touch pad elements of the capacitive touch panel to illuminate the respective input transducer elements formed on the panel, as described below.

FIG. 5 shows (a) the front side (510) and (b) the back side (520) (with the electrode layer omitted) of the capacitive touch panel (320) of the transparent front plate of FIG. 3. The panel (320) is made of a substrate (810) (referring to FIG. 8(*b*), which is a cross-section of a portion of the capacitive touch panel (320)) Capacitive touch pad electrodes, are shown in FIG. 8(*a*). The substrate (810) is made of a transparent dielectric material, in this case a 0.090" thick clear polycarbonate sheet or a clear acrylic plastic sheet, with various coatings on its back side (520). The front side (510) of the panel in this example is uncoated. On the back side (520), a transparent or translucent insulating coating (812) is first applied, leaving open a clear window (610) for viewing the LCD (330) but covering the remaining peripheral area (620). Optionally, an area for a Home key icon (630) may be left also uncoated and open. See FIG. 6.

Figure 6:
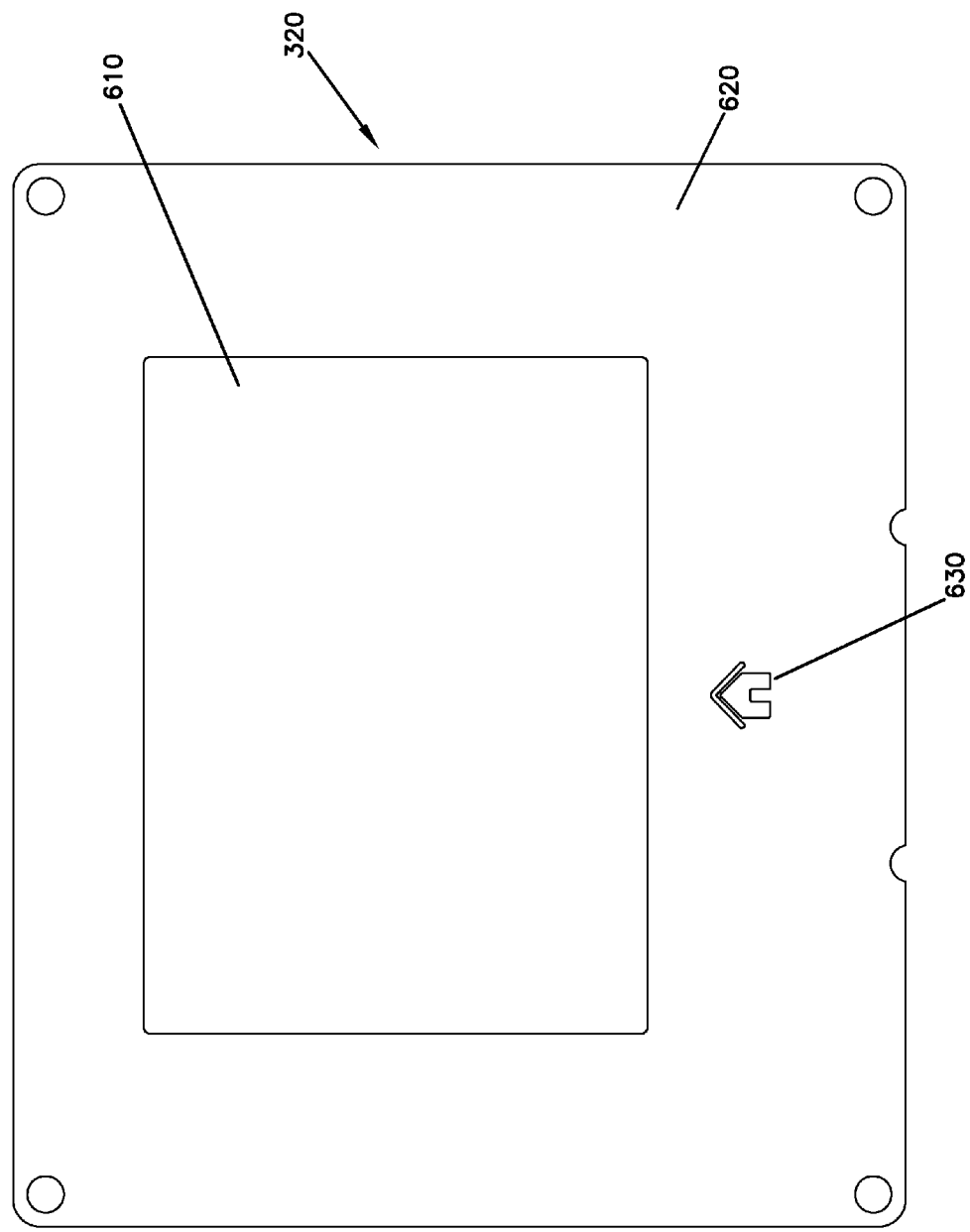
FIG. 6 schematically shows the front view of the capacitive touch panel shown in FIG. 3 according to one aspect of the disclosure.
Figure 7:
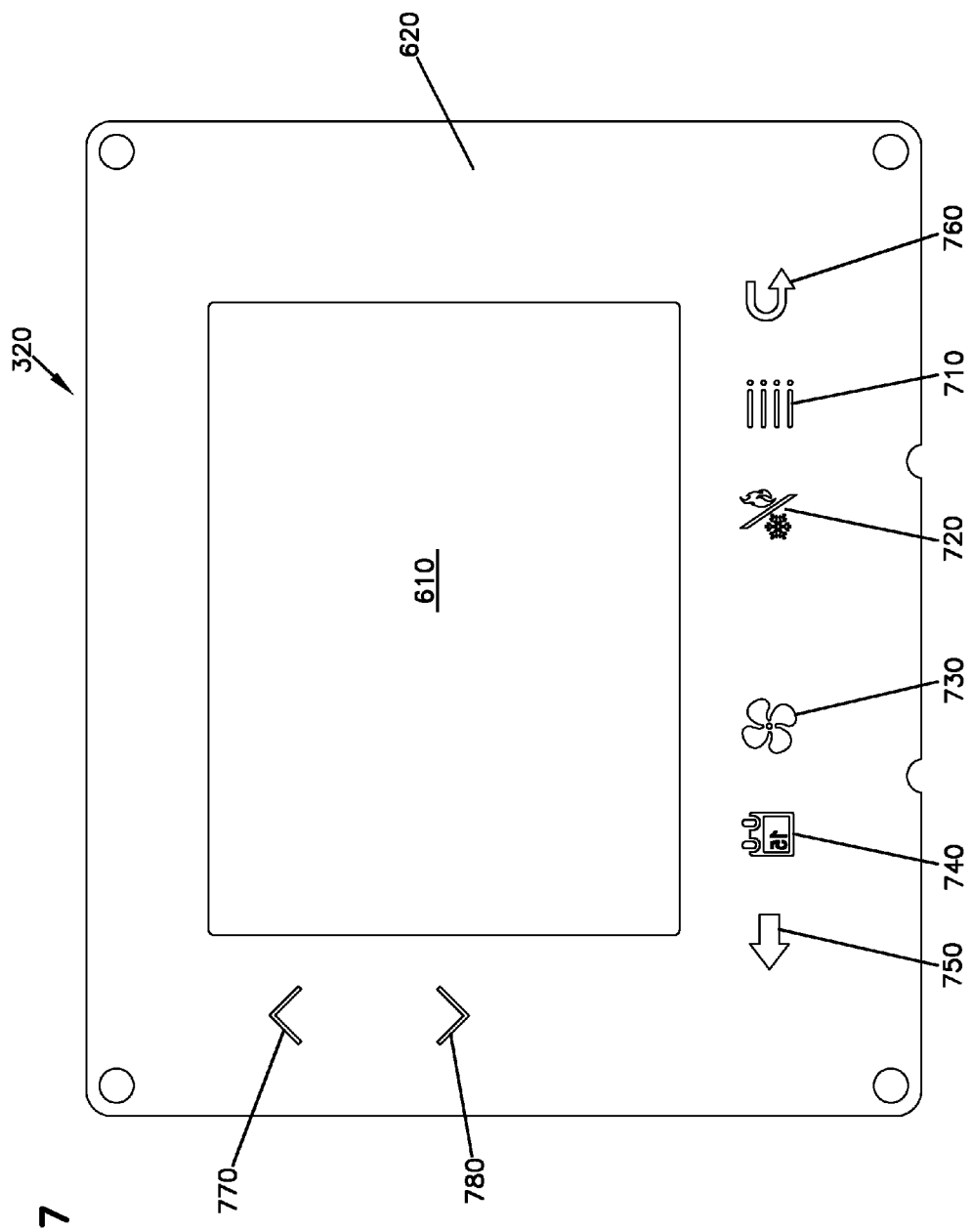
FIG. 7 schematically shows the back side of the capacitive touch panel shown in FIG. 3, without the electrode layer, according to one aspect of the disclosure.
Figure 8A:
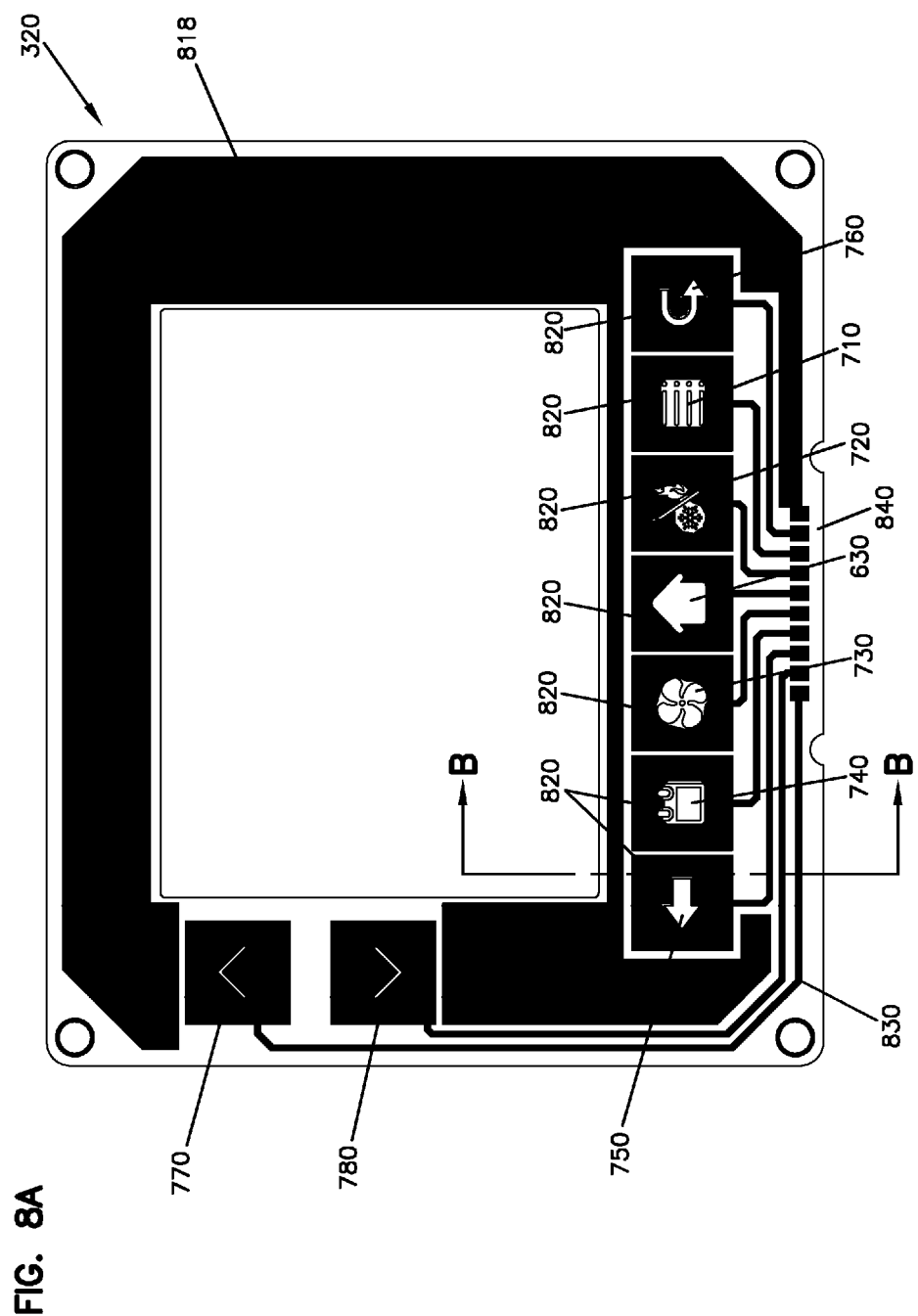
FIG. 8 schematically shows (a) the back side of the capacitive touch panel shown in FIG. 3, with the electrode layer, and (b) the coating layers on the back side of the capacitive touch panel, according to one aspect of the disclosure.
FIG. 8(c) shows an alternative construction of the capacitive touch-panel.
FIG. 8(d) shows an alternative arrangement of LED illuminators and reflectors employed in possible embodiments.
Figure 8B:
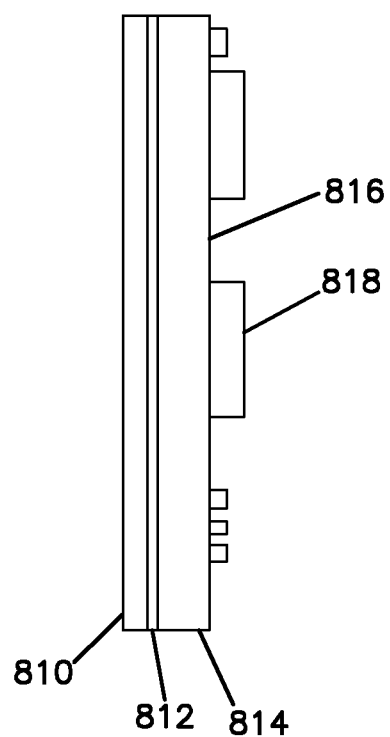
Figure 8C:
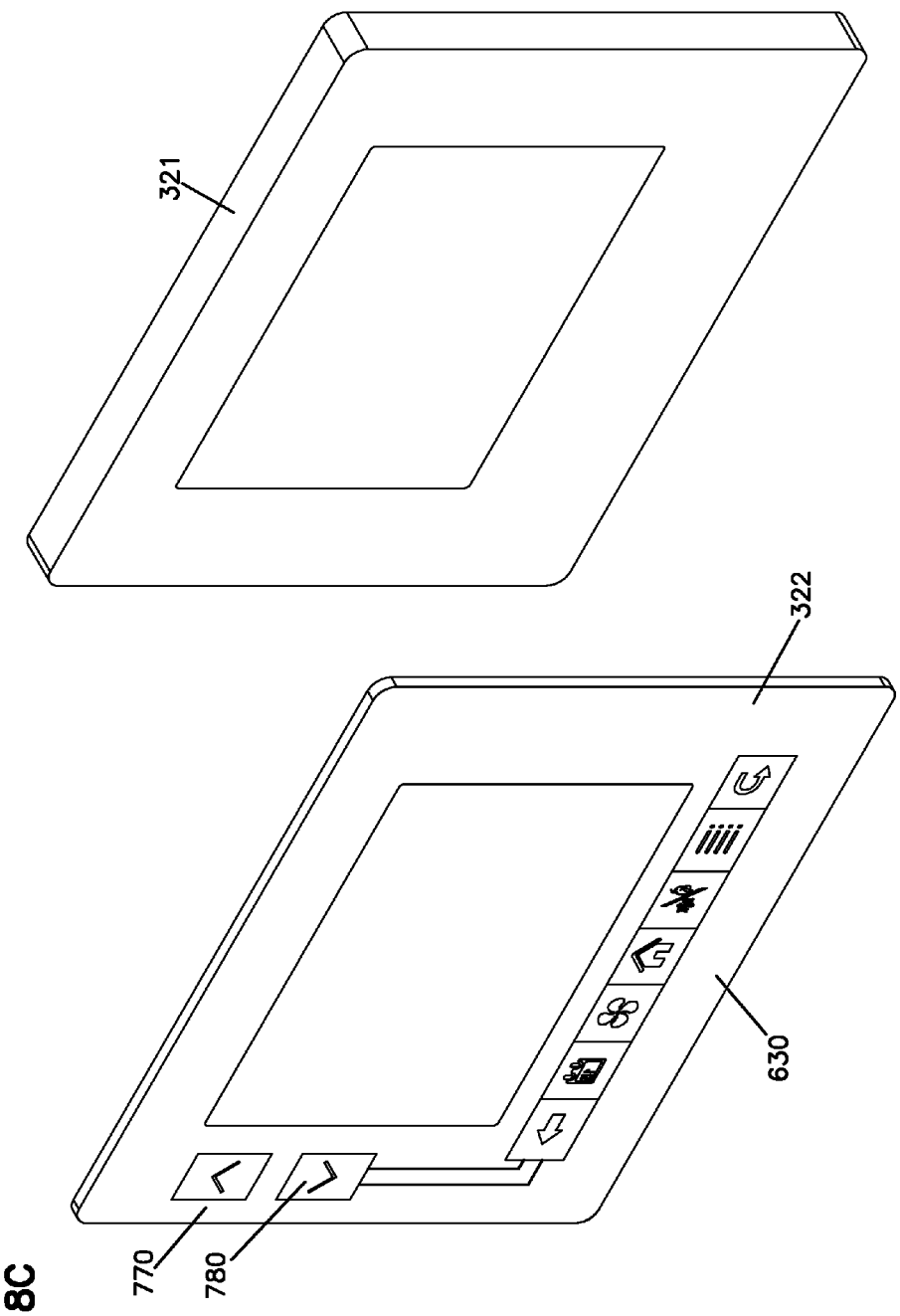
Figure 8D:
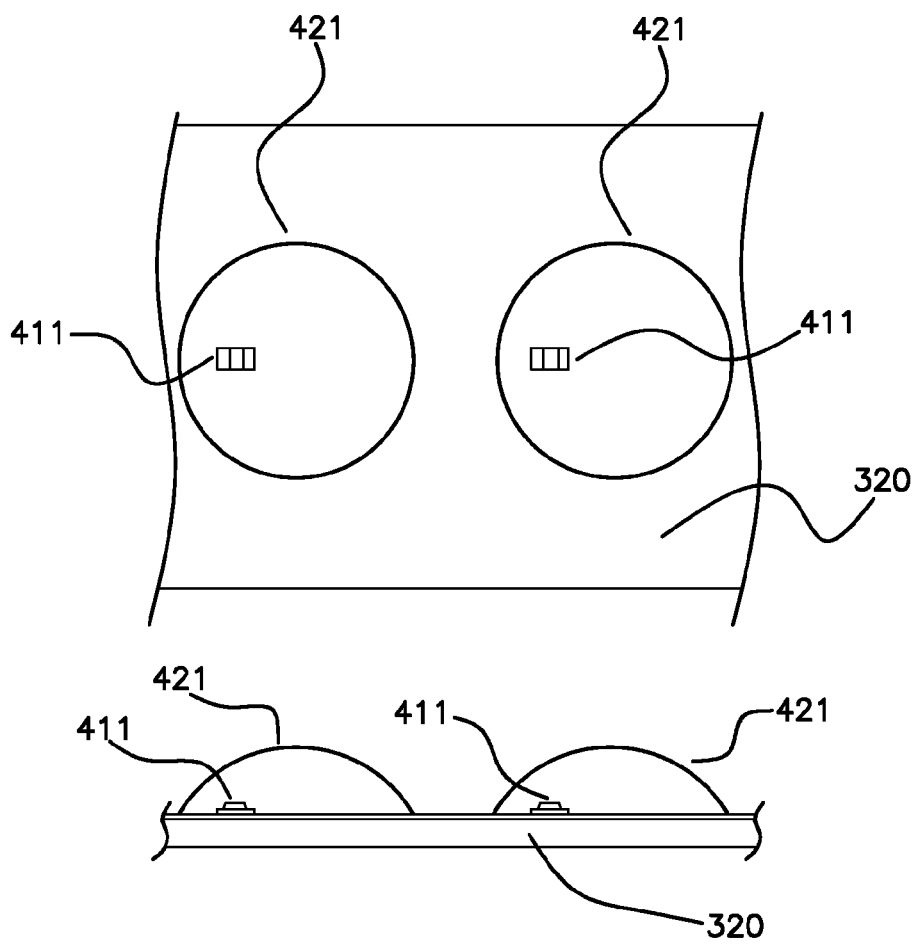

Next, as illustrated in FIG. 7, a more opaque, non-conductive, coating (814) (which may be a highly reflective paint) is applied to area (620) outside the clear window (610), except that shaped voids formed of slits or similar openings (816) are left uncoated to form the icons for the input transducers. In this example, icons for eight input transducer keys are defined: Menu (710), Mode (720), Fan (730), Schedule (740), Right (advance) (750), Left (return) (760), Up (770) and Down (780). The locations of the icons are substantially aligned with respective light sources (410) and domed reflectors (420), as shown in FIG. 4. Illumination from the respective light sources (410) causes the icons to be illuminated and become visible from the through the front plate or capacitive touch panel of the thermostat (100). A more opaque coating at the position of the Home key can be visible from the front through the associated void or opening, making the Home key more visible than the other keys when the icons are not illuminated. This is illustrated in FIG. 6.

Electrodes, that is, capacitive touch pads (820) are formed by depositing a patterned coating (818) on the non-conductive coating (814), again leaving open patterned voids that form the icon patterns for the input transducer keys, including the Home key (630), as shown in FIG. 8. In one embodiment, a carbon ink may be employed for the patterned layer (818), but other suitable conductive materials can be used. For example conductive inks may be laid down by screen printing or ink jet printing. Leads, e.g., conductive traces (830) are also placed on the front plate or touch panel joining the capacitive touch pad electrodes with connector pads formed at a termination area (840), where electrical connections are made to a similar array of connector pads formed on the PCB (350). The elastomer connector (360) (see FIG. 3) is compressively fitted between the two arrays of connector pads to make solderless connections between the PCB and the touch-panel (320). Each of the capacitive touch pads or electrodes (820) forms a capacitor plate, such that its capacitance is significantly altered when the user's fingertip touches the corresponding icon location on the front surface of the panel (320).

An alternative construction of the touch-panel or front plate is shown in FIG. 8(*c*), in which a front panel or plate (321) of a suitable transparent dielectric material, e.g., clear acrylic has its margins outside the window portion coated with a white or colored translucent material, as in the earlier-described embodiment. However, the remaining layers, including the conductive electrodes (touch pads, traces, and connector pads) are ink-jet printed onto a plastic film substrate (322), which may be, for example, PET or polypropylene film. This film is then applied to the back side of the panel (321) and the ensemble is installed into the thermostat as described earlier. The flexible film sheet (322) can be printed flat, but fitted to a contoured face plate or panel (321), which may be suitably contoured to follow the design of the thermostat casing. Other printing methods, e.g., screen printing, can be employed.

As illustrated in FIG. 8(*d*), rather than having the LEDs (410) affixed onto the PCB, individual LEDs (411) or suitable illumination devices can be mounted on the back of the respective touch pads next to the icons or touch pads, and with individual reflector member (421), rather than employing the apertured domes (420) of the first-described embodiment. The reflectors (421) can be silvered (or otherwise metalized) on the inner curved side to increase their reflectance and optimize the illumination of the respective icons.

In these examples, the controller interface or thermostat (100) makes available to the user a set of touch-sensitive input transducers located at the positions of the icons (630 and 710-780). However, with the exception of the Home key icon (630), the icons are hidden (invisible or barely visible) when the light sources (410) are turned off. Those icons (710-780) are illuminated sufficiently to become visible (or more visible) when the respective light sources (410) are turned on. In this example, there is also a light source (e.g., LED) behind the Home key, such that the Home key icon (630) also becomes more visible when the light source behind it is turned on. The Home key icon (630) can be marked other ways, e.g., by having a raised or embossed image at that point (so the Home key becomes tactile) or simply having the Home icon printed to be visible at its position on the panel (320).

Figure 9:
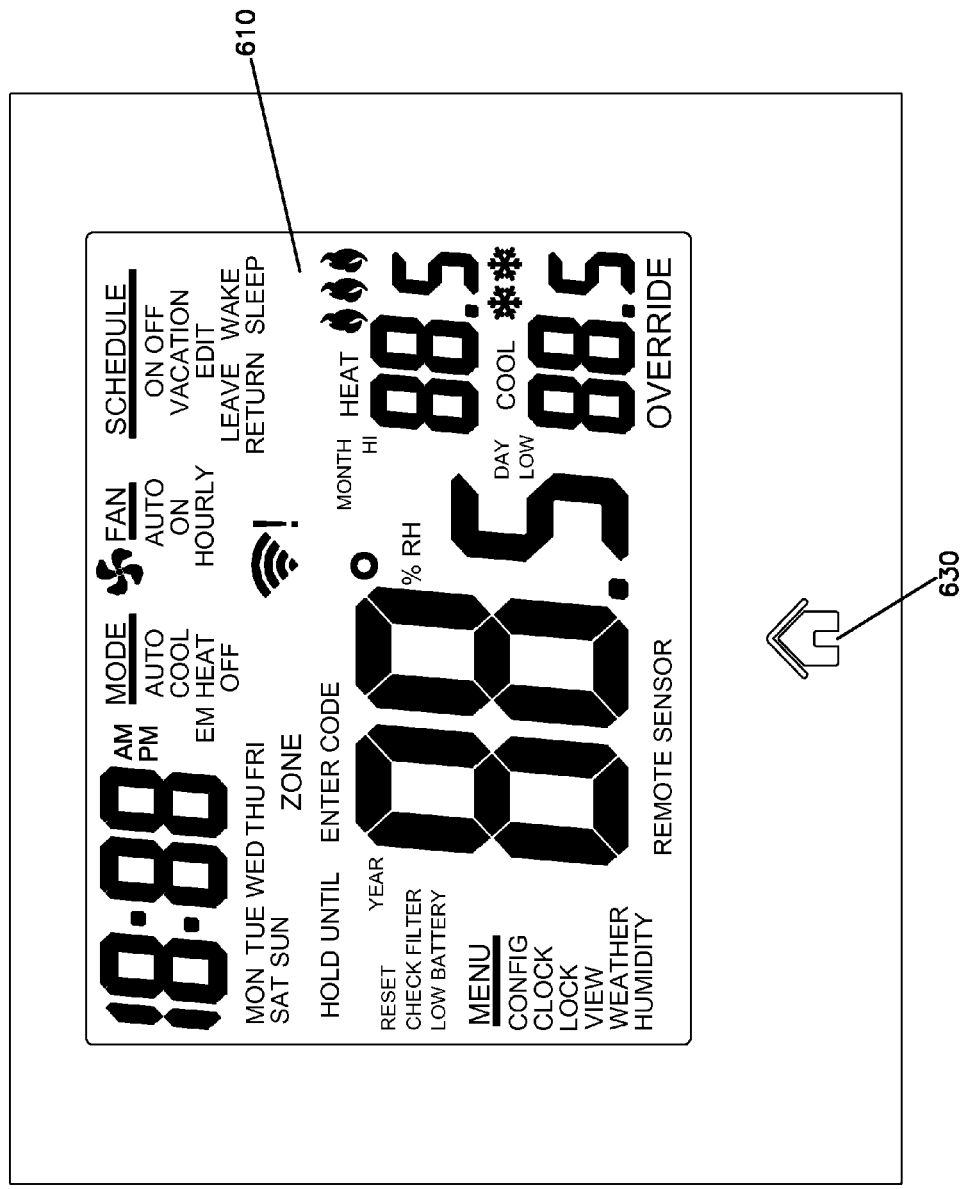
FIG. 9 schematically shows a composite view of the symbols displayable by the LCD display shown in FIG. 3 and the state of illumination of the input sensors in a resting state of the thermostat according to one aspect of the disclosure.

The display (330) in an exemplary embodiment is a monochromic segment LCD with predefined displayable patterns. An example set of displayable patterns is shown in FIG. 9. Such a display provides adequate display of information while having a low level of energy consumption, suitable for a battery operated device. Of course, if the device's operating power is supplied from the household thermostat AC (typically 24 volts/60 Hz) then power consumption is less an issue and other types of display can be employed, such as LED display screen or an Organic LED screen (not shown). In that case, a curved display is possible, and the panel (320) may also be curved or contoured to match the design of the case of the thermostat (100).

The thermostat (100) in this example is configured (for example by employing a suitable program in the thermostat microprocessor) to illuminate only those icons for the input transducers that are valid (permitted or relevant) for the state of the operation or programming of the thermostat. The illuminated icons then guide the user to choose only the illuminated or permitted touch keys or touch pads, thereby avoiding pushing invalid keys, which are ignored by the microprocessor, as the latter is programmed to ignore any signal from invalid (i.e., non-illuminated) keys.

A few examples of operating and programming a thermostat according to aspects of the disclosure are given below.

FIG. 9 schematically illustrates the various symbols, legends and number features that may be displayed by the LCD display (or another type of display such as electrophoretic ink or LED display), and the state of illumination of the corresponding input sensors in a resting state (in this embodiment, this is the default state occurring after a predetermined period of inactivity of the user interface). In the resting state, all LEDs (410) are off. The input keys are thus not illuminated, and only the Home key is visibly presented to the user.

FIG. 10-17 show only the state of illumination of the input keys; the content of the display area of the LCD display is not shown.

Figure 10:
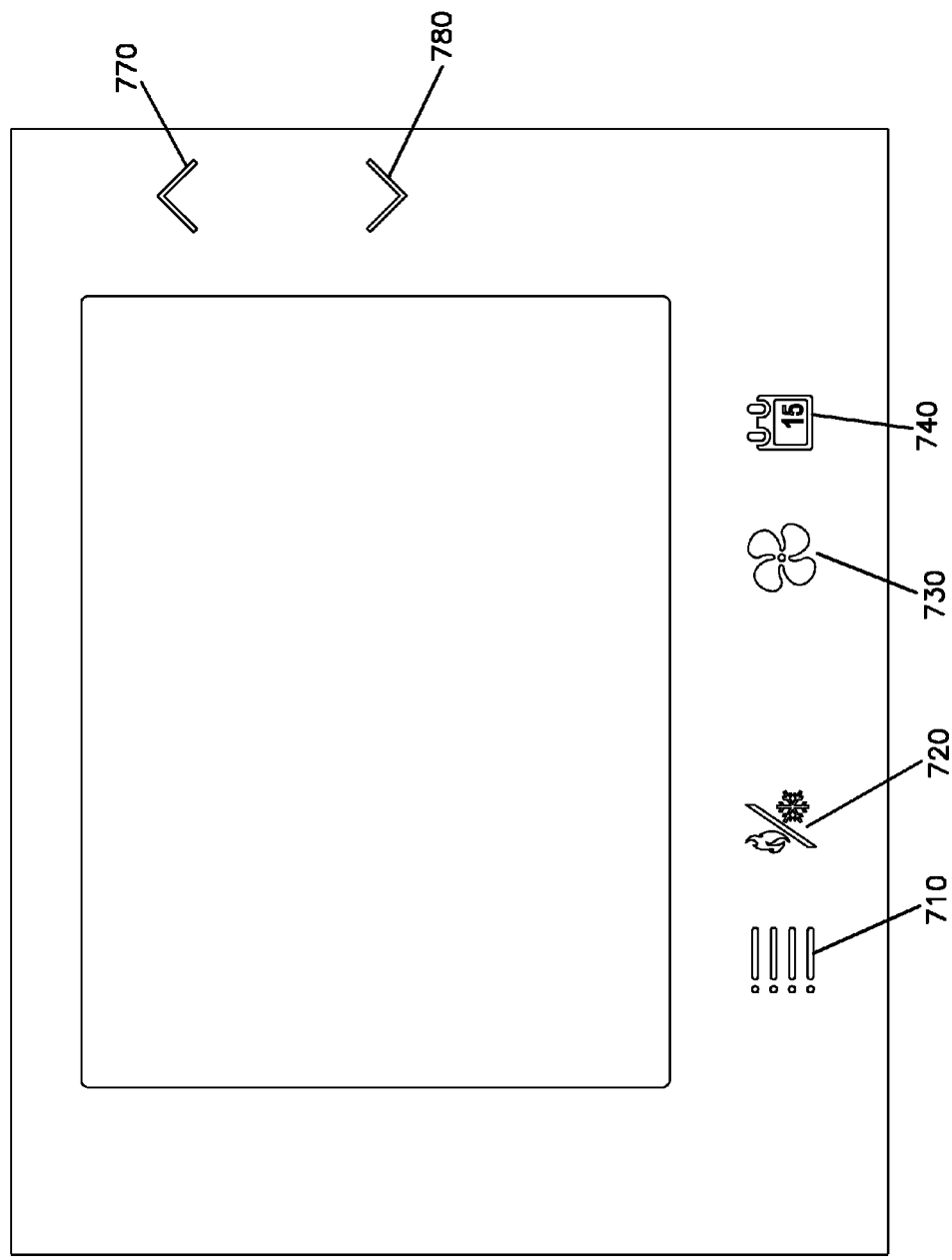
FIG. 10 schematically shows the state of illumination of the input sensors in thermostat shown in FIG. 3 after the Home key is touched, with the thermostat in a mode other than Off according to one aspect of the disclosure.
Figure 11:
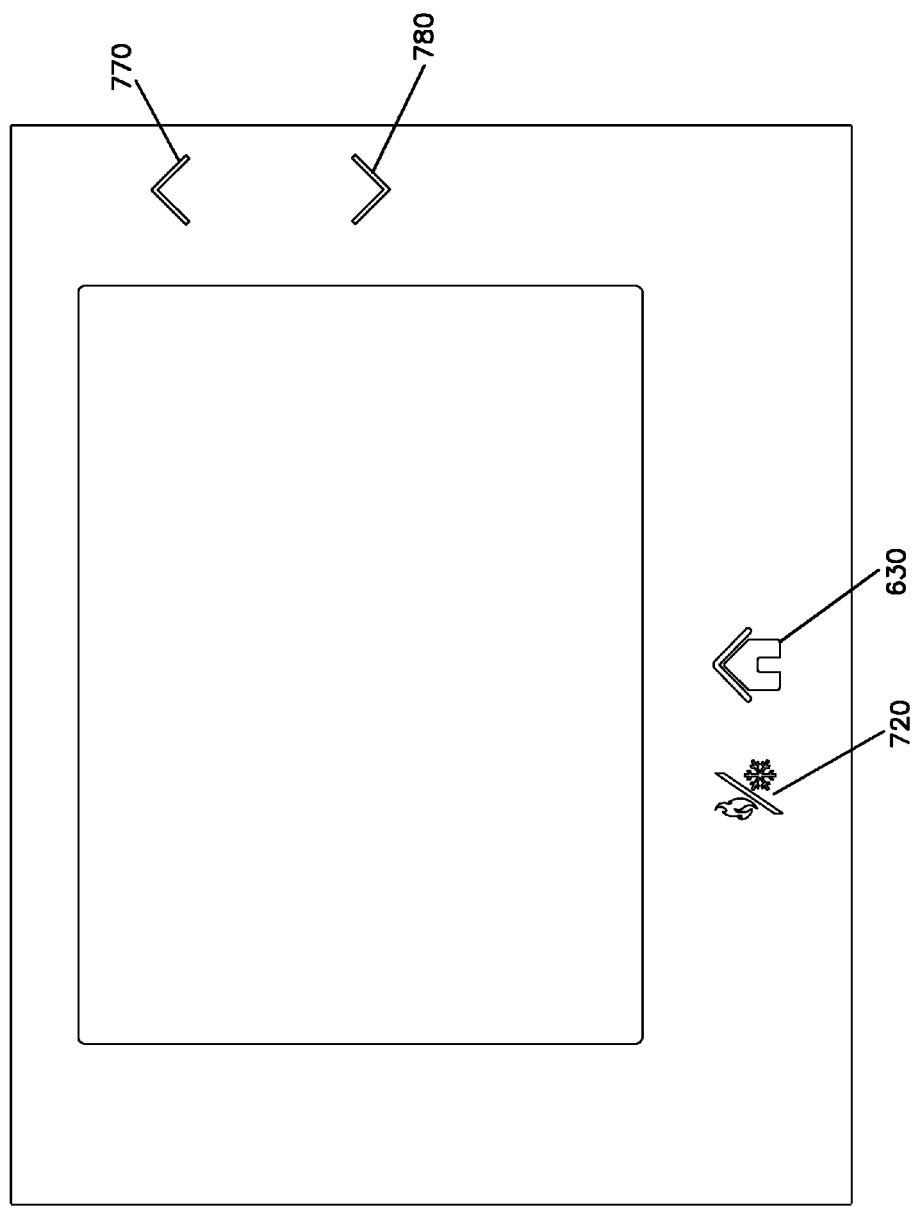

Upon the Home key being touched, as shown in FIG. 10, the thermostat (100) goes to the Home state, and certain LEDs (410) are turned on to illuminate the respective icons. With the thermostat in a mode other than Off, the Up key (770) and Down key (780) are illuminated, and the user is permitted to manually increase or decrease the temperature setting to override the schedule. Also, the Menu key (710), Mode key (720), Fan key (730) and Schedule key (740) are illuminated because the user is permitted to also access their corresponding functions.

However, the Right or Advance icon (750) and Left or Return icon (760) are not illuminated in this state because those keys have no valid function to perform.

At this point, if the Mode key (720) is touched to select the mode select function (e.g., Auto, Heat, Cool, Emergency Heat of Off), the Menu key (710), Fan key (730) and Schedule key (740) are no longer illuminated, as they do not serve any function consistent with mode selection. The Mode key icon (720) is illuminated and it can be touched repeatedly to cycle through the available modes.

Figure 12:
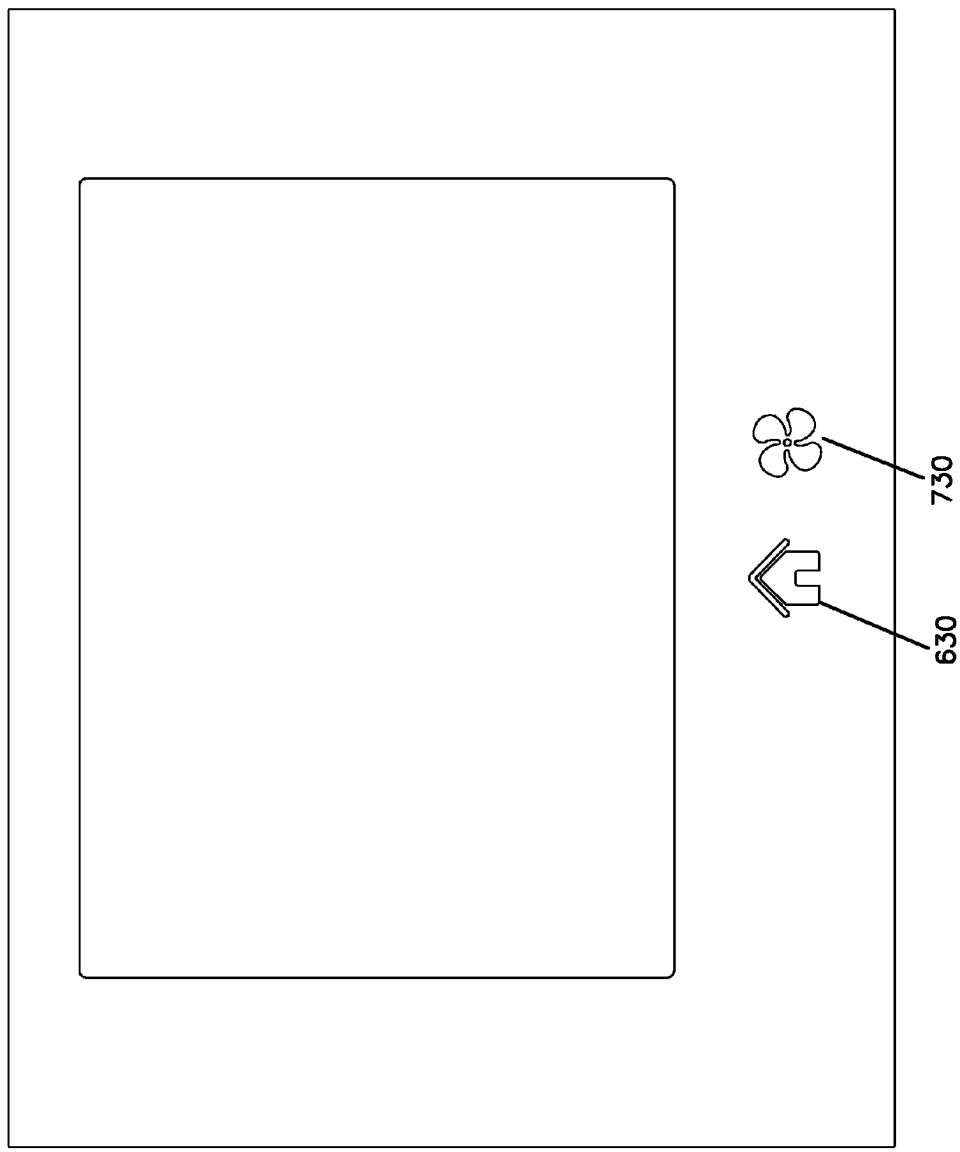

If the Fan key (730) is touched when the thermostat is in the Home state, then the thermostat goes to the fan set state, in which only the Fan key icon (730) and Home key icon (630) are illuminated, as shown in FIG. 12. The Fan icon (730) can then be tapped repeatedly to cycle through the various modes for fan operation (e.g., On, Off, Auto, Hourly). The Home key (630) is also illuminated to let the user know to tap on it to return to the Home state. No other key is illuminated as no other key operation is permitted in fan mode selection.

Figure 13:
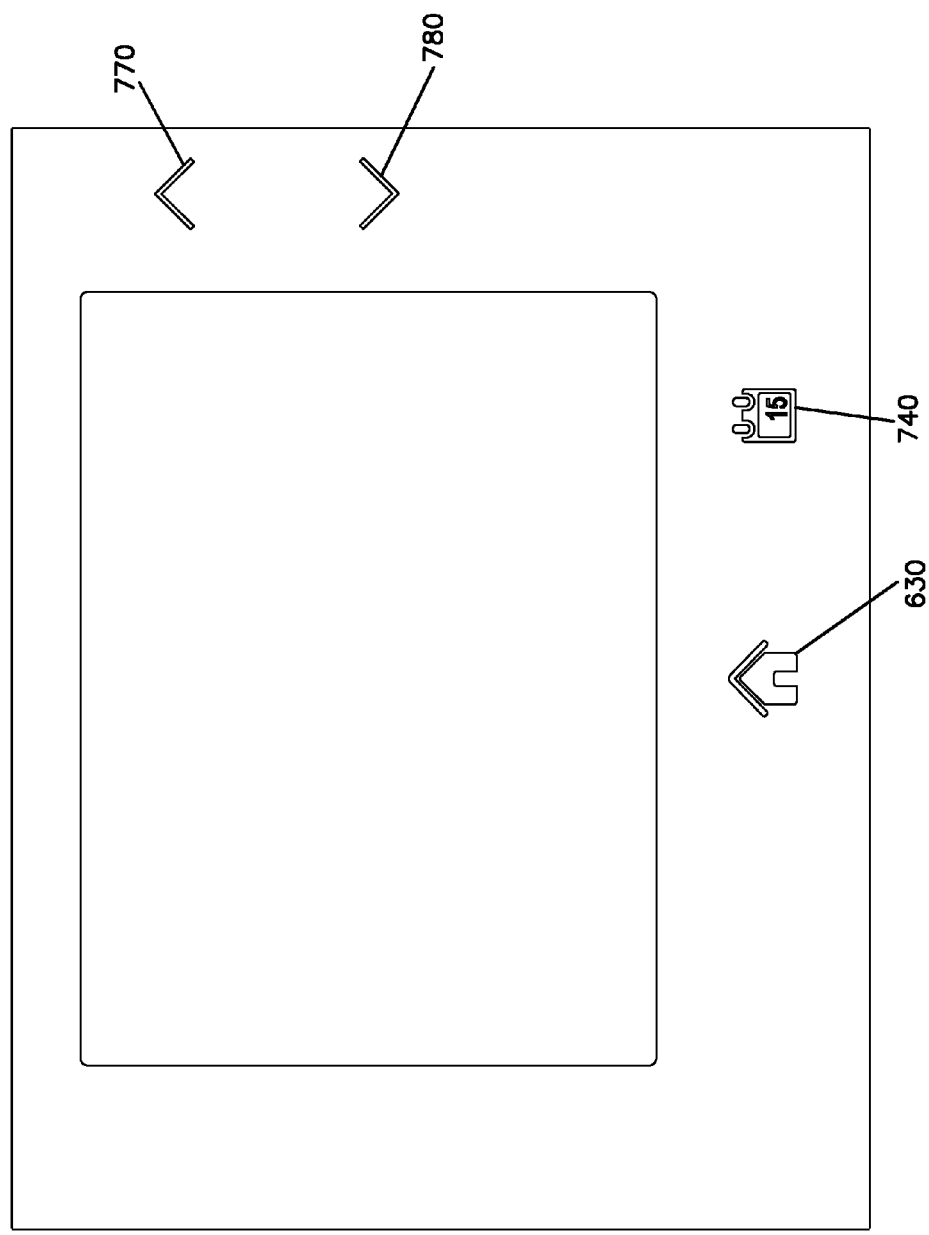

FIG. 13 after the Schedule key icon (740) has been touched when the thermostat is in the Home state. Here the Schedule key (740) can be touched or tapped on repeatedly to cycle through the available scheduling modes (e.g., On, Off, Vacation). The Up- and Down-key icons (770, 780) are also illuminated and let the user know that the user can use these keys to adjust the current temperature set points (heat or cooling). The Home key icon (630) is also illuminated. No other icon is illuminated or available.

Figure 14:
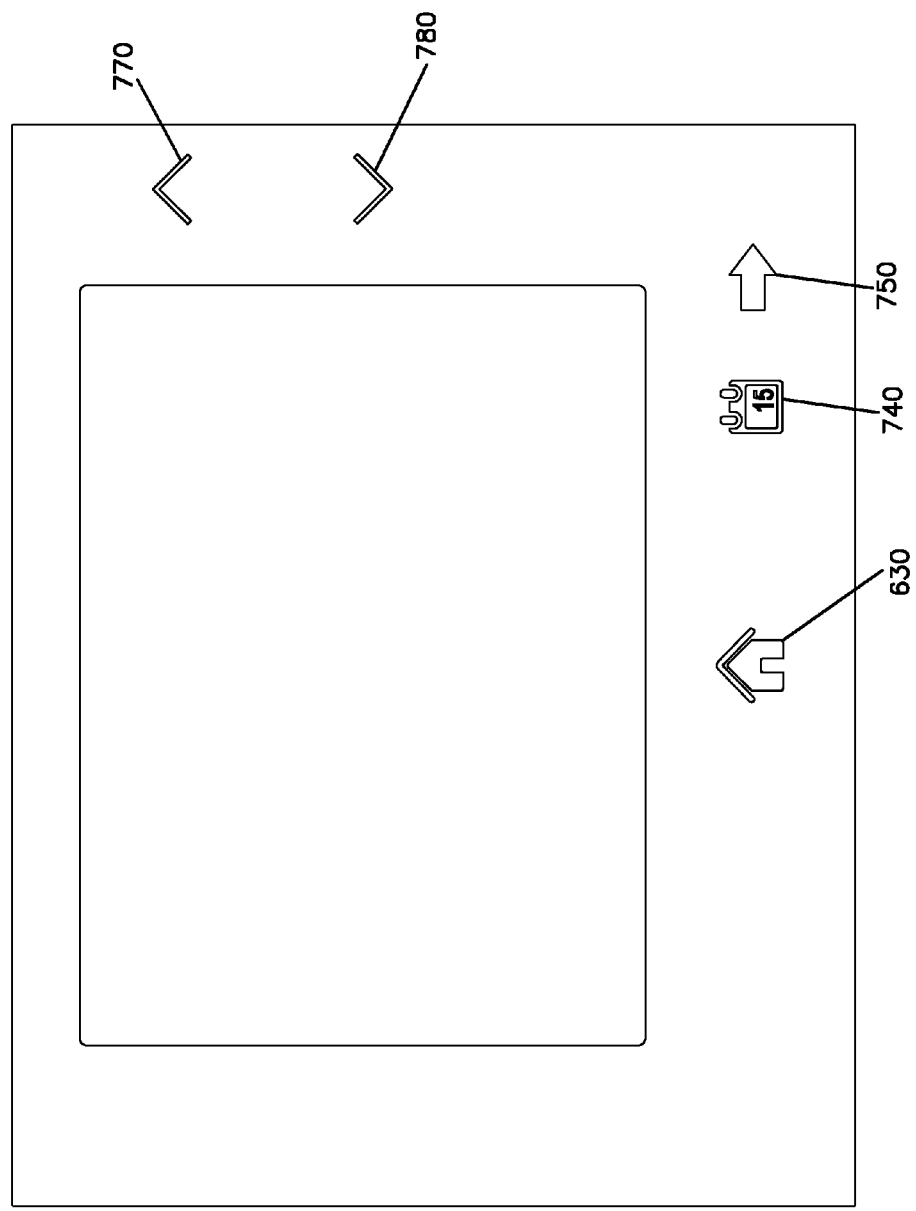

FIG. 14 shows the state of illumination of the input sensors icons after the Schedule key (740) is touched in when the thermostat is in the Home state. As shown in FIG. 14, the Schedule key (740) can be tapped to bring the thermostat into a schedule setting mode, such as the "Vacation" setting mode. Here, the Right or Advance key icon (750) is illuminated to indicate to the user that this key (750) can be used for additional settings within the Vacation mode.

Figure 15:
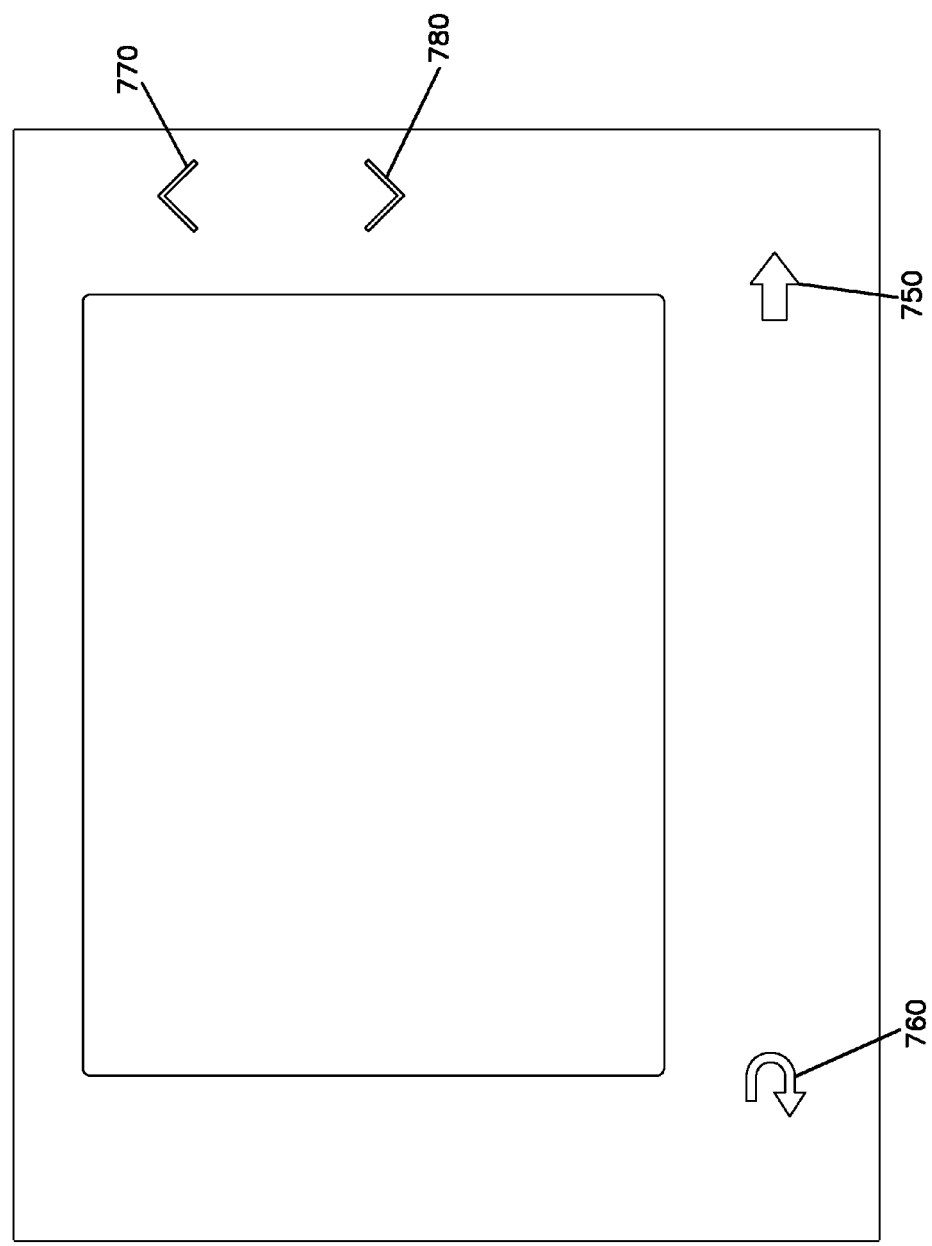

FIG. 15 shows the state of illumination of the input sensor icons after the Right key (750) has been touched while the thermostat is in the state shown in FIG. 14. In this state, the Home key (630) is no longer illuminated and unavailable. However, the Left or Return key icon (760) is illuminated and can be touched or tapped on to return the thermostat to the previous state. The Schedule key icon (740) itself is also dark (not illuminated) at this point, as only changing the length of the temperature holder period is permitted in the Vacation setting mode, and these functions are adjusted using the Up key (770) and the Down key (780).

Figure 16:
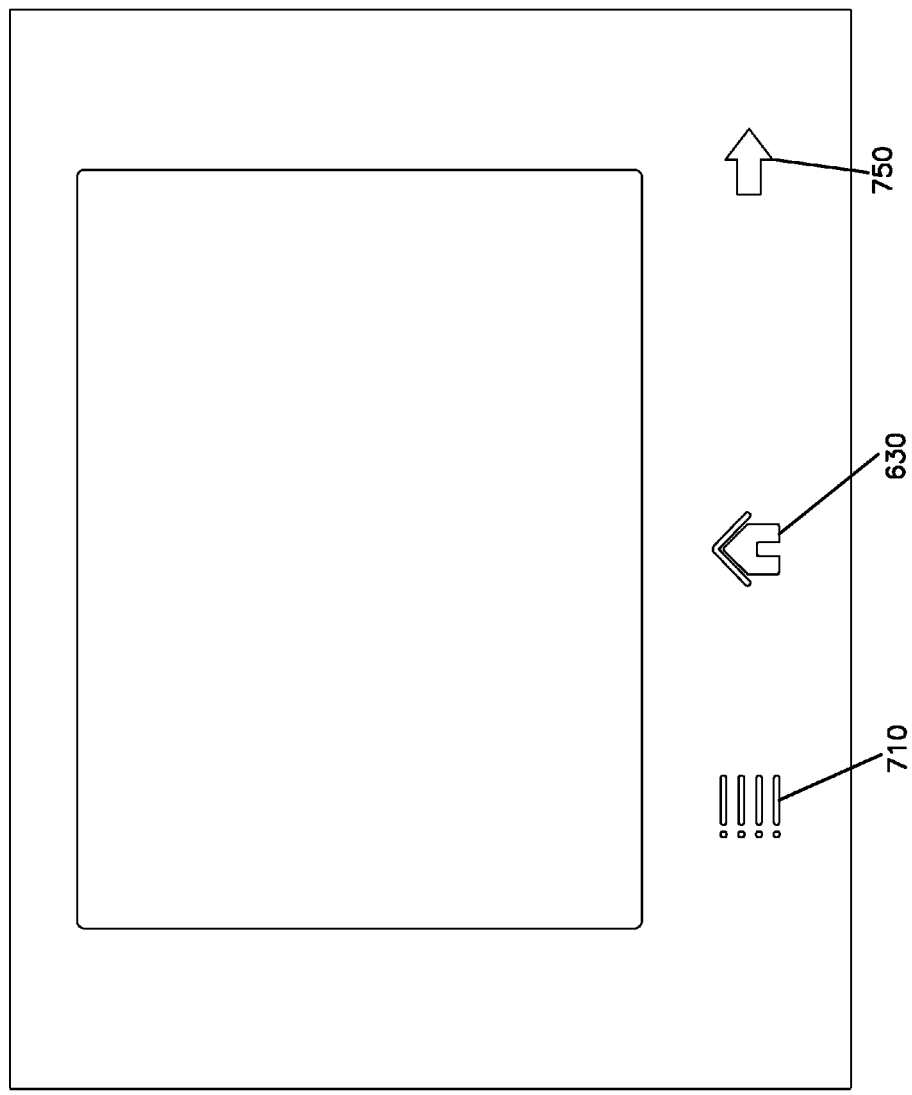

FIG. 16 shows the state of illumination of the input sensor icons after the Menu key icon (710) has been touched or tapped when the thermostat is in the Home state. In this state, the Menu key (710) can be tapped on to cycle through the various menu modes (e.g., Edit Schedule, Clock, View, Lock, Configuration). The Right key (750) is also illuminated and can be touched to enter the particular menu mode that the user desires to visit to make an adjustment. No other key icon other than the Home key icon is illuminated or available.

Figure 17:
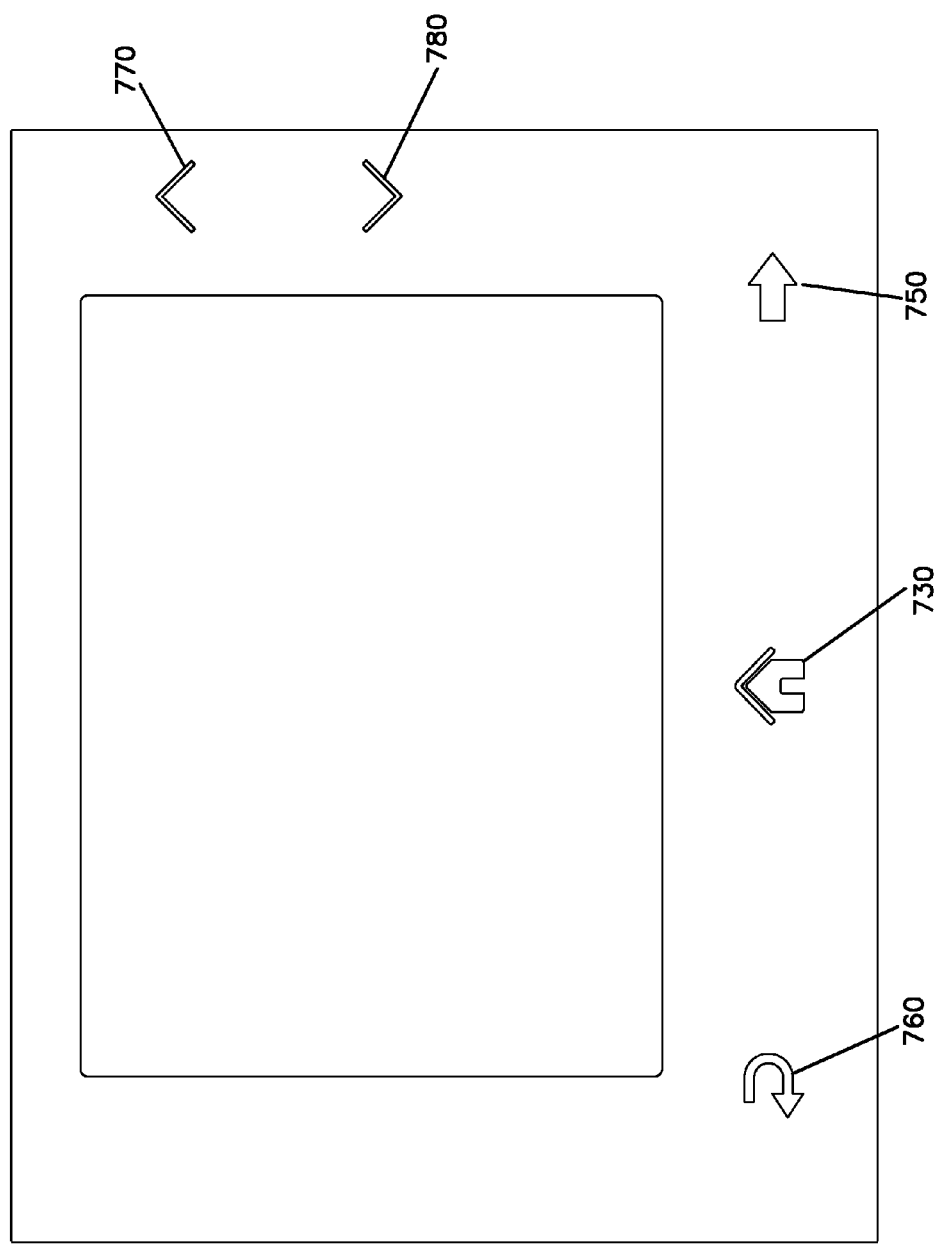

FIG. 17 shows the state of illumination of the input sensor icons after the Right key (750) is touched in the state shown in FIG. 16 when the Menu key has established the menu mode to "EDIT SCHED" (Edit Schedule). Here, the Right key (750) can be touched to access the next schedule item in the schedule to be edited, and the Up- and Down-keys (770, 780) can be touched to change the accessed schedule item. The Left or Return key (760) can be touched to return to the previous schedule item. No other key icon besides the Home key icon is illuminated or available.

Thus, a user interface device and method as described above provide a convenient, efficient and accurate user interface for an appliance controller. With the input keys being dynamically illuminated or otherwise indicated, a user is guided to focus only the subset of the input keys that a valid for the current state of operation or programming of the controller. Confusion and mistaken key actuations (by the invalid keys) are minimized or eliminated. The specific devices and arrangement as disclosed in this embodiment, such as the capacitive touch panel and segment LCD display, also provides for economical construction of the controller and low energy consumption, which is desirable for battery-based applications In examples of the wall thermostat or other control interfaces according to the present disclosure, the touch panel (320) is formed of a face plate or front glass (preferably formed of a tough, clear polymer such as acrylic) with a favorable dielectric constant. The front surface of the face plate is clear, i.e., uncoated, and the rear surface receives a coat or a white translucent, non-conductive material, leaving a rectangular space corresponding to the position of the LCD screen (or other display). Then a conductive material is laid down in a pattern to form the touch-sensor pads, connector pads and conductive traces that connect the touch sensor pads to the connector pads. Icons are formed as outlines in the touch pads, i.e., etched out or simply left bare, within each pad, with each pad and each having a shape or design intended to suggest the function to the homeowner. The icons leave a translucent path for light through each icon.

LEDs or other durable convenient illumination sources, are affixed onto the facing side of the printed circuit board or PCB, and at locations at or near the margins of the PCB and aligned so as to be in registry with the associated touch pad (and icon). Alternatively, the LEDs can be secured onto the front plate or front glass at the position of the icon with suitable reflectors and connectors to connect the LEDs to the PCB.

In this embodiment, the spacer between the PCB and the face plate has an array of domes formed on the periphery surrounding the opening for the LCD screen. Each dome an open apex that is positioned to align with the LED that is associated with the respective touch pad and icon. The domes can be white or silvered, and are designed to be an optical conduit for guiding the light from each LED to the respective icon. When any given touch sensor (and icon) is activated, as described earlier, so that the microprocessor is able to accept input from the touch sensor, the LED behind that touch sensor is turned ON, and light is visible through the outline of the icon and through the white translucent coating. The LEDs for any touch sensors that are not needed for a given phase of the programming or setting of the thermostat are left OFF, and the microprocessor ignores any input from those touch sensors. Optionally, the reverse side of the conductive touch pad can also be highly reflective, so light reflected back from it is re-reflected from the dome, enhancing the presentation of the icon.

As an alternative to the foregoing construction of the spacer and LEDs, the LEDs can be affixed or embedded onto individual reflectors which can be domed (i.e., spherical or parabolic). These reflectors attach to the face plate at the locations of the sensors/icons, and may have printed conductors that connect with traces printed onto the face plate.

As shown e.g. in FIGS. 4 and 8, the connector pads (840) on the face plate (320) are grouped into a row along the lower margin of the face plate, and the corresponding connector pads on the PCB (350) are positioned in a row that is directly behind them and in registry with them. A rubber-like elastomeric connector, which are formed of a sequence of alternating strips of conductive and insulating elastomeric material is positioned in a gap in the spacer (340) at that same location and is compressed between the PCB and the face plate when the PCB and face plate are assembled together into the thermostat. This ensures a reliable, solderless connection between the PCB and the touch sensor pads. Alternative solderless connectors may be used, such as spring pins.

The LCD display (330) is fitted behind the face plate on the PCB to align with the rectangular window of the face plate. The LCD displays visual indicia for time, room temperature, setpoint temperatures for heating and cooling, fan speed, mode, etc. (See FIG. 9) but no touch sensitive elements are present on the LCD screen in this embodiment, as they are on the face plate on the lower and side margins off the LCD display.

Display elements other than the LCD display (330) shown in this embodiment can be employed instead, including color displays, or flexible or curved displays using OLED or AMOLED technology. These may also accommodate thermostats in which the front face plate is curved to follow contours of the thermostat frame and bezel design.

As an alternative to the front face plate as discussed above, the white translucent margin and conductive pads, traces and connector pads may be printed onto a transparent film membrane that is then placed onto the rear side of the clear acrylic face plate. This construction permits modern ink jet technology to print with translucent ink and then with a conductive ink to form the touch pads, connector pads and traces. The circuit arrangements for various models of the thermostat can be changed and printed simply by changing the program for inkjet printing. A convenient existing conductive ink can have copper particles suspended in a liquid carrier, with the copper particles being in contact with one another once the carrier evaporates.

As another example of another control interface device that can avail of the advantages of certain features according to this disclosure, FIGS. 18 to 21 show the touch panel control interface (FIG. 18) for a typical available microwave oven, which can employ technology that is the same as or similar to the technology employed in the touch-panel thermostat as just described to blank out or hide at least some of the controls that are not needed for a given control operation, and instead guide the user by simplifying the visual presentation of the touch keys or sensors.

Figure 18:
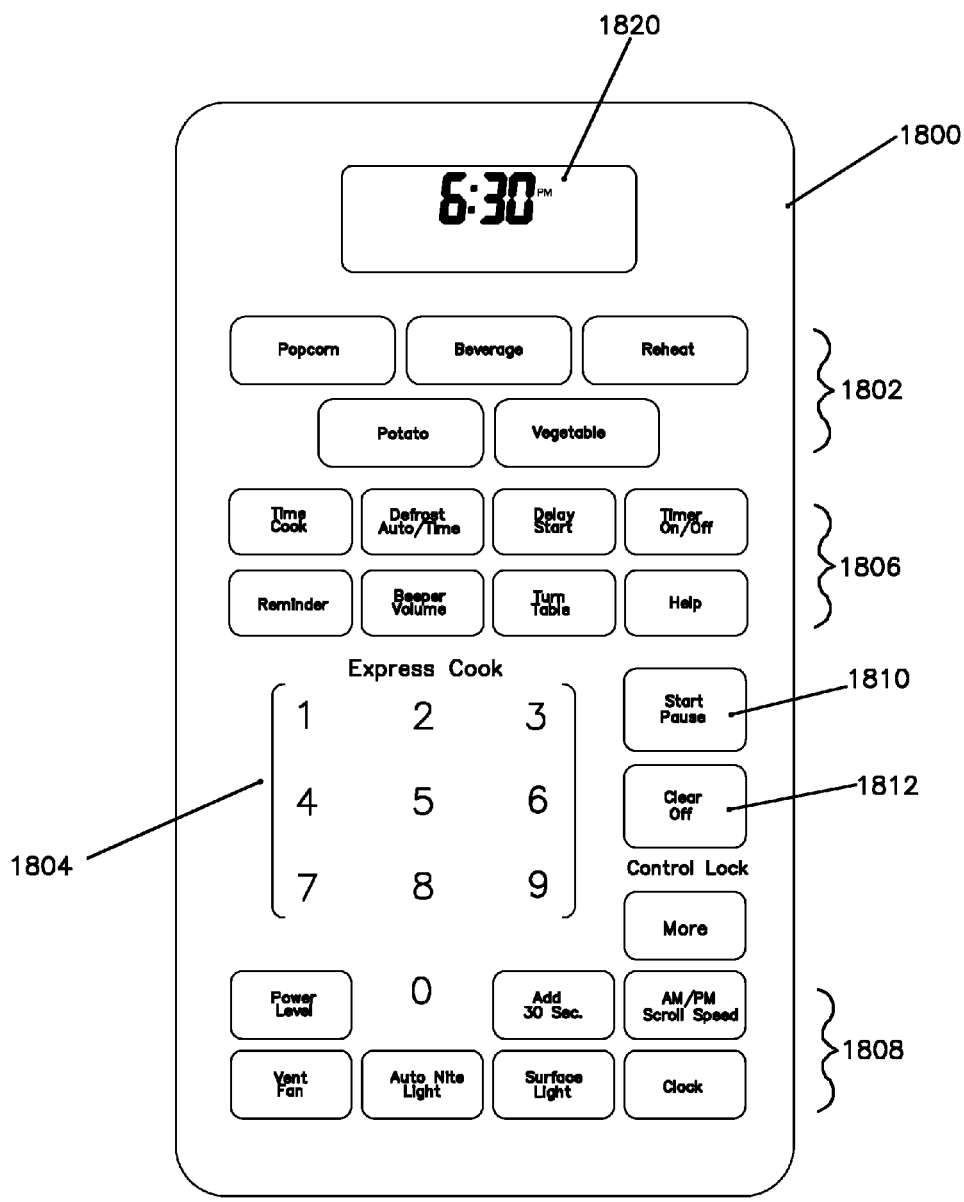
FIG. 18 shows an example of a touch control panel for an available microwave oven.

FIG. 18 shows a touch-panel control interface (1800), which is typical of controls found on many microwave ovens. Here, at the top is an LCD screen which presents the time of day when the oven is idle, but can present messages to the user during programming the oven and then can also present the remaining cook time, for example, when the oven is in use. There are numerous touch keys present on the touch-panel, all of which have a name for their role printed in small print. In each microwave oven model, the arrangement of these touch keys is different. This makes the control interface quite confusing to the user, requiring considerable experience in using the oven (much of which is trial-and-error) to figure out what all the controls are for. In this example, there is a group of "Sensor Cooking" buttons (1802), at the top near the LCD display, a group of Express Cook keys or buttons (1804), near the center, additional cooking function keys (1808), and other miscellaneous control keys (1806). To the right of the Express Cook group (1804) is a Start/Pause key (1810) and a Clear/Off key (1812). In the conventional microwave oven control interface, these groups of keys are all visible and in many cases all active during the programming operation.

Figure 19:
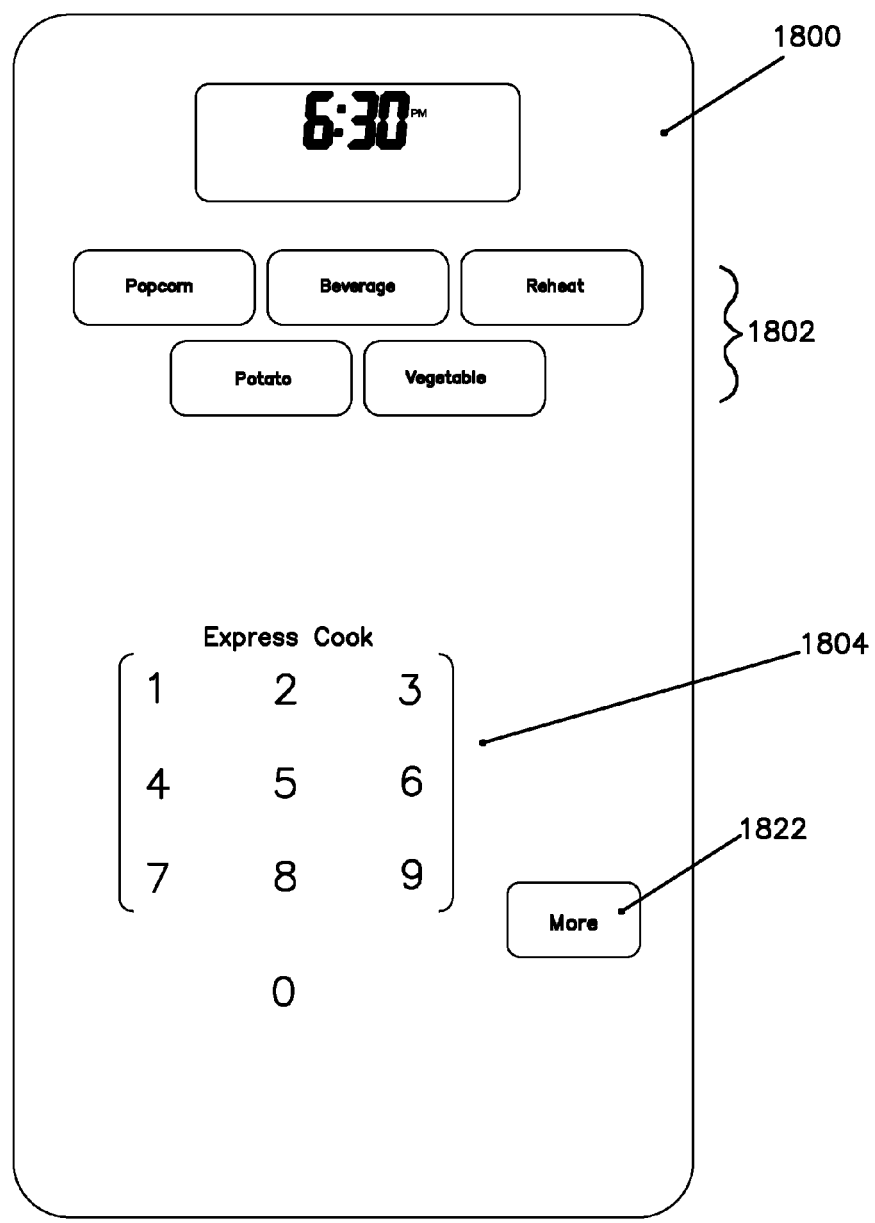
FIGS. 19 to 21 show a touch control panel according to an aspect of this disclosure, with various touch sensors or groups of touch sensor made visible or hidden to facilitate the programming of the appliance.
Figure 20:
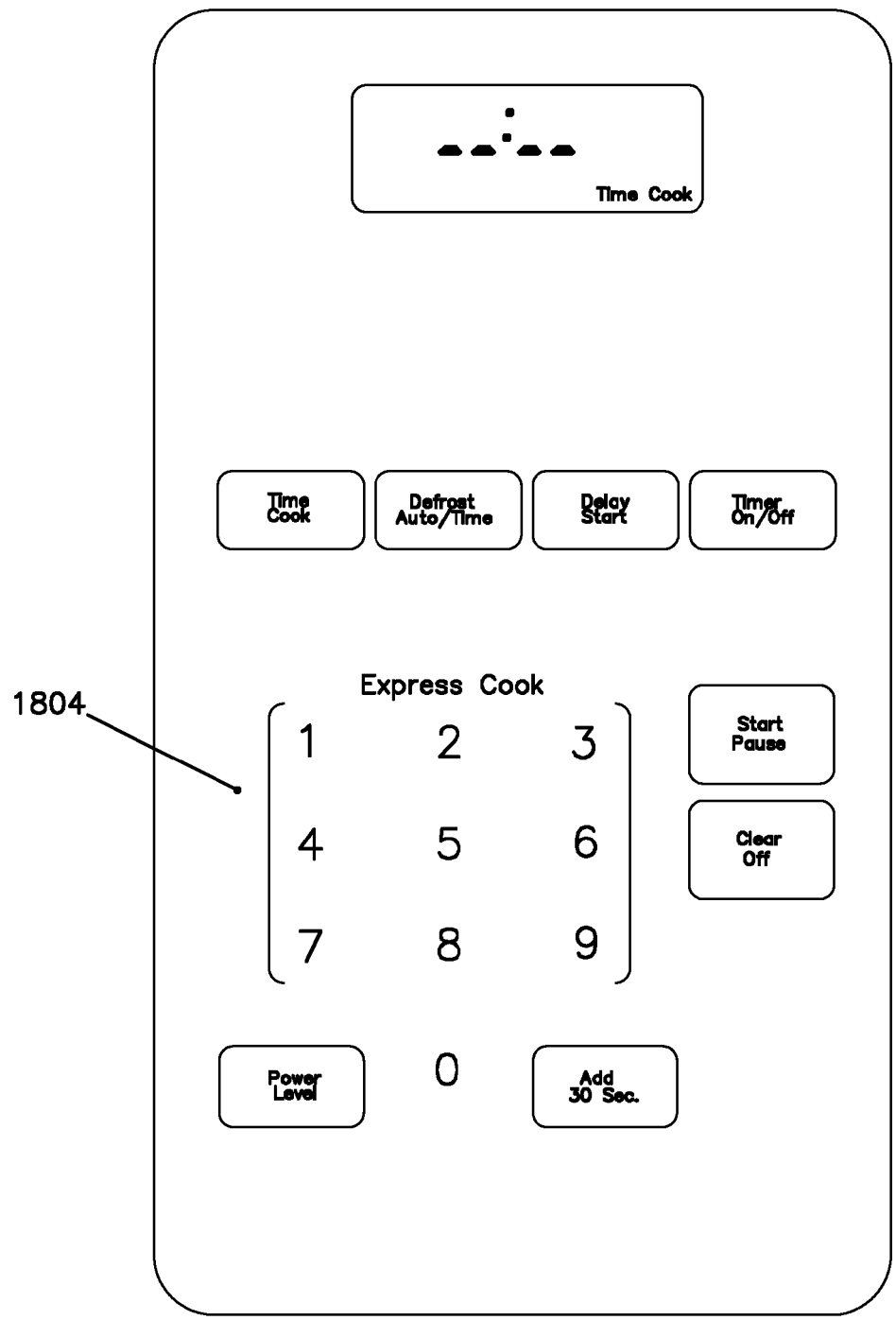
Figure 21:
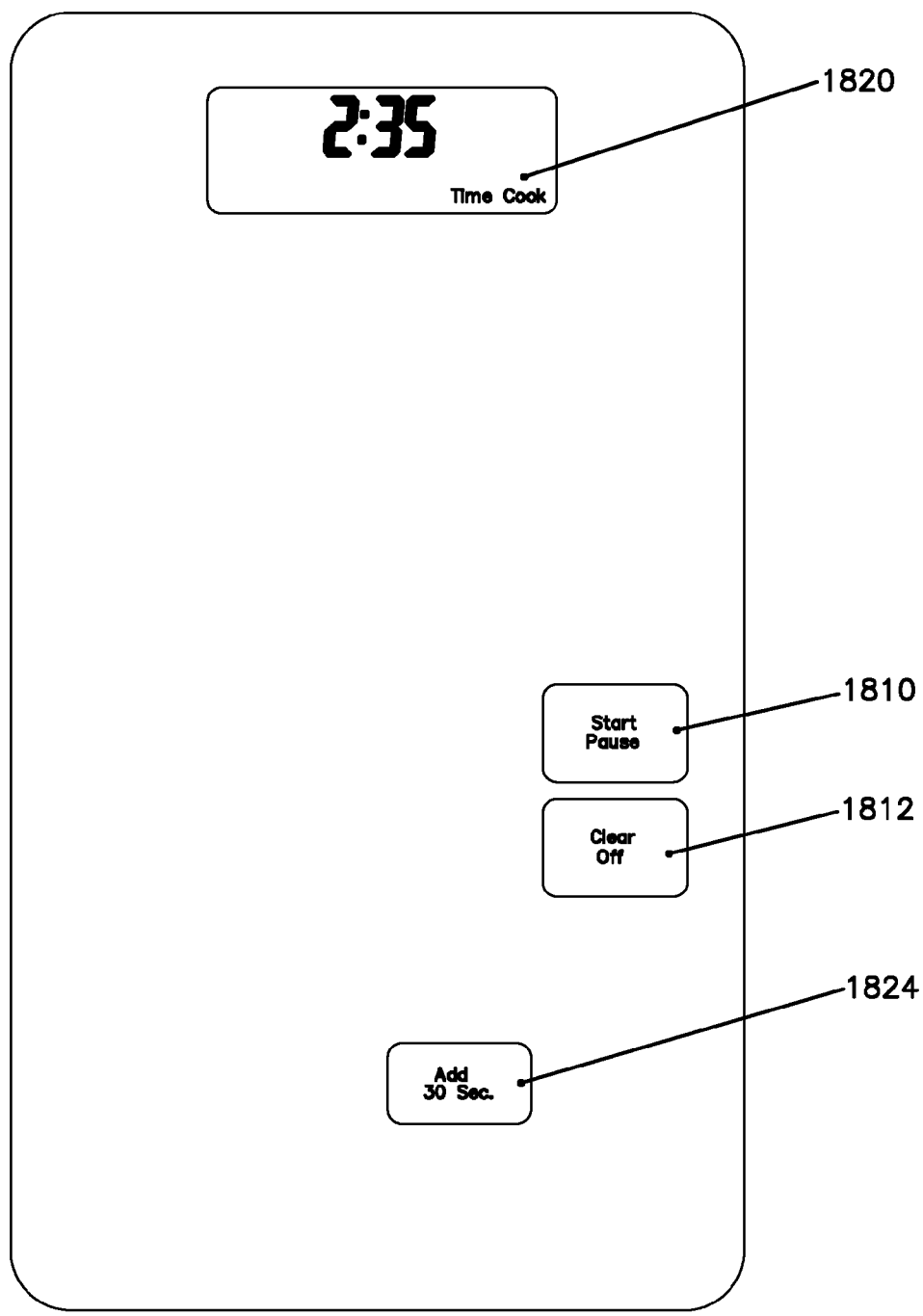

Certain features according to the present disclosure may be employed, to simplify the control interface as shown as control interface (1800) in FIG. 19. Here, the Sensor Cooking group (1802) and Express Cooking group (1804) are visible and active when the oven is idle, and all the other keys and touch sensors are off and hidden. These are activated or woken up by touching a MORE key (1822), here in a corner separated from the groups (1802) and (1804). To program the oven for a normal use, such as to heat a food item for some period of time, the user touches either the Sensor Cooking group (1802) or the Express Cooking group (1804). In this example, the user touches the Express Cook group (1804), and then only the Express Cooking keys (1804) and such other keys as are relevant to a timed cooking operation are visible and active, as shown in FIG. 20. All the other touch sensors and keys are hidden. The user can make adjustments to the time and cooking speed or power level, but the buttons or keys not relevant to this operation are hidden, removing a source of mistake and confusion. Then once the cooking operation is started, the remaining cook time plus limited other information is displayed on the LCD screen (1820), and all the buttons disappear except START/PAUSE (1810), CLEAR/OFF (1812) and an add time button (1824).

If the user instead selects the SENSOR COOKING group (1802), for example for cooking popcorn or reheating a hot beverage, the keys not relevant to that operation also disappear in a similar fashion. When a special key is needed, e.g., for setting the clock time, the user can press the MORE key (1822). However, these keys are needed only a small percentage of the time, so it is an advantage that they remain hidden behind the MORE key. Numerous other appliances that are amenable to having a touch-panel control interface can be made more user-friendly by adopting the principles of this invention when constructing the control interface.

Many modifications and variations of the examples disclosed herein, and numerous other embodiments of the invention, can be made without exceeding the scope of the invention, which is to be measured by the claims hereto appended.

We claim:

1. A controller interface, comprising: a plurality of input elements, each comprising a touch sensor, coupled to a controller circuit device of a controlled device and adapted to operate or configure the controller circuit device to set or adjust an operating mode of the controlled device;

a plurality of indicators respectively associated with the plurality of input elements and being capable of being set in at least an illuminated and non-illuminated states, each of the plurality of indicators comprising a light source positioned to illuminate a design formed on the associated touch sensor, the design defining a shaped void formed in an opaque layer and adapted to pass light from the associated light source, wherein each of the light sources is adapted to be ON so as to identify to a user the associated input element when the associated input element is active;

the controller circuit device being operative to actively monitor or to ignore each of said input elements according to an interface program, and to set each of the plurality of indicators in one of the indication states based on whether the associated input element is set to be actively monitored or ignored in accordance with said interface program.

2. The controller interface of claim 1, wherein the plurality of the input elements each comprise a capacitive touch sensor.

3. The controller interface of claim 2, wherein the capacitive touch sensors each comprise a transparent or translucent dielectric substrate, an insulating coating on the dielectric substrate, and the opaque layer comprises an electrode layer formed on said insulating coating.

4. The controller interface of claim 1, wherein said interface includes a programmable thermostat, and wherein the input elements are adapted to operate or program the thermostat.

5. A method of guiding a user through a multi-step operation or configuration of a controller interface associated with a controlled device, comprising, for establishing a desired operation or configuration of the controlled device by employing a plurality of input elements of said interface, each of which has an associated indicator to signal whether the input element is active or ignored, each of the plurality of indicators comprising a light source positioned to illuminate an icon design formed on the associated touch sensor, the icon design defining a shaped void formed on an electrode layer and adapted to pass light from the associated light source; establishing an active or ignored state for each of said input elements depending on which step of the multi-step operation or configuration is being carried out; and turning on only the indicator or indicators associated with the active input elements, wherein turning on an indicator comprises turn the associated light source to ON so as to identify the location of the associate input elements for the user.

6. A touch-panel control interface for a controlled device, the control interface comprising a face plate formed of a transparent dielectric plate, a printed circuit board, a microprocessor mounted on the printed circuit board and programmed to respond to touch commands, and a plurality of illumination sources positioned behind said face plate; wherein said face plate includes a layer of a non-conductive translucent material disposed on a back side of said transparent dielectric plate, a conductive opaque layer laid down in a predetermined pattern on said non-conductive translucent layer, said pattern including a plurality of capacitive touch pads at predetermined locations on the back side of the face plate adapted to generate the touch commands, a plurality of connector pads situated within a predetermined location on the back of said face plate, and conductive paths connecting respective ones of said capacitive touch pads to associated ones of said connector pads; and wherein shaped void areas are formed in each of said capacitive touch pads to permit light to pass therethrough and through said non-conductive translucent material and said face plate to form visible icons at said predetermined locations; a conductive connector connecting said connector pads on said face plate to corresponding electrodes of the printed circuit board, and a plurality of illumination devices each respectively coupled to a predetermined output of said microprocessor and being positioned behind a respective one of said capacitive touch pads, the microprocessor being suitably programmed so that for any given phase of a control operation for entry of settings into said control interface, the microprocessor is operative to receive a signal from only predetermined ones of said capacitive touch pads, fewer than all of said capacitive touch pads, and to ignore signals from the remaining ones of said capacitive touch pads, and is also operative to illuminate only the illumination devices associated with said predetermined ones of the touch pads and leave off those illumination devices associated with said remaining ones of said capacitive touch pads.

7. A touch-panel control interface according to claim 6, further comprising a display screen positioned behind said face plate and coupled to said microprocessor to display indicia as commanded by said microprocessor, and the face plate having a clear window formed therein through which the display screen is visible.

8. A touch-panel control interface according to claim 7, wherein the display screen and illumination devices are carried on the printed circuit board, and further comprising a spacer frame disposed between an outer margin of said face plate beyond said window and said printed circuit board, and including a plurality of apertured reflector domes corresponding to position respective positions of said illumination devices.

9. A touch-panel control interface according to claim 7, wherein said conductive connector includes a plurality of conductive connector pads positioned on said printed circuit board at locations in registry with the conductive connector pads formed on the back side of said face plate; and an elastomeric connector member compressively positioned between said face plate and said printed circuit board and in contact with the connector pads of said face plate and the connector pads of said printed circuit board.

10. A touch-panel control interface according to claim 6, wherein said icons are visible on the front of the face plate only when the corresponding illumination device is lit, and are not visible otherwise.

11. A touch-panel control interface according to claim 6, the face plate comprising a film of a clear plastic resin, said layer of non-conductive translucent material and said conductive opaque layer being printed onto said film, said conductive opaque layer being printed with a conductive ink.

12. A touch-panel control interface according to claim 6 comprising a home icon that is raised or embossed onto the front of the face plate at the location of a predetermined one of said capacitive touch pads, such that the position of the home icon can be detected by touch.

13. A touch-panel control interface according to claim 6, wherein said face plate is formed with a contoured, non-flat front surface.

14. A controller, comprising:
a plurality of input devices adapted to operate or configure the controller to operate a controlled device, the plurality of the input devices each comprising a capacitive touch sensor;
a plurality of indicators respectively associated with the plurality of input devices, each of which being capable of being set in at least two indication states, the plurality of indicators each comprising a light source positioned to illuminate at least a portion of the input device;
microprocessor adapted to, for a state of operation or configuration of the controller, set each of the plurality of indicators in one of the indication states based on whether activation of the input device with which the indicator is associated is permitted or required for the state,
the capacitive touch sensors each comprising a transparent or translucent dielectric substrate, an insulating coating on the dielectric substrate and defining an opening adapted to pass light, and an electrode layer adapted to pass light therethrough, and through the insulating coating, to the dielectric substrate, wherein the light source are each positioned to shine light through the electrode layer and insulating coating layer to illuminate an portion of the capacitive touch sensor.

15. The controller of claim 14, further comprising a programmable thermostat, wherein the input devices are adapted to operate or program the thermostat.

* * * * *